United States Patent
Kaczmarczyk et al.

(10) Patent No.: US 12,518,192 B2
(45) Date of Patent: Jan. 6, 2026

(54) QUANTUM MODULATION CLASSIFIER SYSTEM AND METHOD

(71) Applicant: Qoherent Inc., Markham (CA)

(72) Inventors: Adrian Kaczmarczyk, Markham (CA); Wan Liu, Markham (CA); Ashkan Eshaghbeigi, Markham (CA); Lorne Swersky, Markham (CA)

(73) Assignee: Qoherent Inc., Markham (CA)

( * ) Notice: Subject to any disclaimer, the term of this patent is extended or adjusted under 35 U.S.C. 154(b) by 50 days.

(21) Appl. No.: 18/442,288

(22) Filed: Feb. 15, 2024

(65) Prior Publication Data
US 2024/0428113 A1    Dec. 26, 2024

Related U.S. Application Data

(60) Provisional application No. 63/450,329, filed on Mar. 6, 2023.

(51) Int. Cl.
*G06N 10/60* (2022.01)
*G01R 29/06* (2006.01)

(52) U.S. Cl.
CPC ............. *G06N 10/60* (2022.01); *G01R 29/06* (2013.01)

(58) Field of Classification Search
CPC .......... G06N 10/60; G06N 3/045; G06N 3/08; G06N 10/00; G06N 20/00; G01R 29/06; G06F 18/24
See application file for complete search history.

(56) References Cited

U.S. PATENT DOCUMENTS

| | | | |
|---|---|---|---|
| 7,428,270 B1 * | 9/2008 | Dubuc | H04L 27/0012 455/226.1 |
| 10,572,830 B2 | 2/2020 | O'Shea | |
| 11,032,014 B2 | 6/2021 | O'Shea et al. | |
| 11,210,368 B2 | 12/2021 | Caglar | |
| 11,270,217 B2 | 3/2022 | Tee et al. | |

(Continued)

FOREIGN PATENT DOCUMENTS

| | | |
|---|---|---|
| CA | 3088650 A1 | 7/2019 |
| CA | 3112817 A1 | 4/2020 |

(Continued)

OTHER PUBLICATIONS

Wu, Y. et al., "Radio Signal Classication by Adversarially Robust Quantum Machine Learning". Arxiv.org, Dec. 13, 2023 (Dec. 13, 2023), [online] [retrieved on May 16, 2024 (May 16, 2024)]. Retrieved from the Internet: <https://arxiv.org/abs/2312.07821>.

(Continued)

*Primary Examiner* — Vineeta S Panwalkar
(74) *Attorney, Agent, or Firm* — J. Robin Rohlicek

(57) ABSTRACT

A quantum modulation classifier. The quantum modulation classifier includes a trained quantum variational classifier including a plurality of qubits. The quantum variational classifier includes an embedding stage operable to apply a quantum embedding technique to embed a modulated radio signal, a variational stage operable to receive the modulated radio signal from the embedding stage and pass the modulated radio signal through a plurality of variational layers, and a measurement stage operable to receive the modulated radio signal from the variational stage and extract measurement results to classify the modulated radio signal.

19 Claims, 22 Drawing Sheets

(56) References Cited

U.S. PATENT DOCUMENTS

| | | | |
|---|---|---|---|
| 2010/0150222 | A1 | 6/2010 | Meyers et al. |
| 2019/0095756 | A1 | 3/2019 | Agrawal et al. |
| 2020/0265333 | A1 | 8/2020 | Horesh et al. |
| 2021/0150401 | A1 | 5/2021 | Zhuang et al. |
| 2021/0256416 | A1* | 8/2021 | Bocharov ............ G06N 10/20 |
| 2021/0264199 | A1 | 8/2021 | Walters et al. |
| 2021/0295107 | A1 | 9/2021 | Krishna et al. |
| 2021/0334626 | A1 | 10/2021 | Hang et al. |
| 2022/0012618 | A1 | 1/2022 | Salim et al. |
| 2023/0073231 | A1 | 3/2023 | Sogabe et al. |

FOREIGN PATENT DOCUMENTS

| | | | |
|---|---|---|---|
| CN | 109800883 | A | 5/2019 |
| CN | 109067473 | B | 7/2019 |
| CN | 110009108 | A | 7/2019 |
| CN | 110879105 | A | 3/2020 |
| CN | 111709530 | A | 9/2020 |
| CN | 112001498 | A | 11/2020 |
| CN | 110149207 | B | 3/2021 |
| CN | 112464003 | A | 3/2021 |
| CN | 113052317 | A | 6/2021 |
| CN | 113379059 | A | 9/2021 |
| CN | 113449778 | A | 9/2021 |
| CN | 113676266 | A | 11/2021 |
| CN | 114169469 | A | 3/2022 |
| CN | 114358317 | A | 4/2022 |
| CN | 114358318 | A | 4/2022 |
| CN | 114358319 | A | 4/2022 |
| CN | 114399053 | A | 4/2022 |
| CN | 114444701 | A | 5/2022 |
| CN | 114444702 | A | 5/2022 |
| CN | 114565096 | A | 5/2022 |
| CN | 108701263 | B | 6/2022 |
| CN | 114358295 | B | 6/2022 |
| CN | 114663690 | A | 6/2022 |
| CN | 114667710 | A | 6/2022 |
| CN | 114819163 | A | 7/2022 |
| CN | 113379060 | B | 9/2022 |
| CN | 115293254 | A | 11/2022 |
| CN | 115374948 | A | 11/2022 |
| CN | 115409189 | A | 11/2022 |
| CN | 115438790 | A | 12/2022 |
| CN | 115618232 | A | 1/2023 |
| CN | 115630705 | A | 1/2023 |
| CN | 115761384 | A | 3/2023 |
| CN | 115828999 | A | 3/2023 |
| CN | 115860130 | A | 3/2023 |
| CN | 113408731 | B | 4/2023 |
| CN | 113449778 | B | 4/2023 |
| CN | 115936134 | A | 4/2023 |
| EP | 1445890 | A1 | 8/2004 |
| IN | 202147044181 | A | 10/2021 |
| IN | 202141009256 | A | 9/2022 |
| JP | 4775820 | B2 | 9/2011 |
| JP | 6165638 | B2 | 7/2017 |
| JP | 2021026370 | A | 2/2021 |
| JP | 6979661 | B2 | 12/2021 |
| JP | 2021193615 | A | 12/2021 |
| JP | 2023039444 | A | 3/2023 |
| KR | 20210081859 | A | 7/2021 |
| KR | 20220015308 | A | 2/2022 |
| WO | 2017131081 | A1 | 8/2017 |
| WO | 2017197008 | A1 | 11/2017 |
| WO | 2019163866 | A1 | 8/2019 |
| WO | 2020077288 | A1 | 4/2020 |
| WO | 2020167466 | A1 | 8/2020 |
| WO | 2020201002 | A1 | 10/2020 |
| WO | 2020263146 | A1 | 12/2020 |
| WO | 2021238279 | A1 | 12/2021 |
| WO | 2021243454 | A1 | 12/2021 |
| WO | 2022106003 | A1 | 5/2022 |
| WO | 2023287333 | A1 | 1/2023 |

OTHER PUBLICATIONS

Yen-Chi Chen, S. et al., "Variational Quantum Circuits for Deep Reinforcement Learning". Arxiv.org, Jul. 20, 2020 (Jul. 20, 2020), [online] [retrieved on May 16, 2024 (May 16, 2024)]. Retrieved from the Internet: <https://andv.org/pd171907.00397>.

Kuar, A. et al., "A comprehensive survey on machine learning approaches for dynamic spectrum access in cognitive radio networks.". Journal of Experimental & Theoretical Artificial Intelligence, Feb. 2022 (Feb. 2022), vol. vol. 34 Issue 1, pp. p. 1-p. 40, [online] [retrieved on Dec. 31, 1899 (Dec. 31, 1899)].

International Search Report (ISR) & Written Opinion (WO) mailed Jun. 13, 2024 in PCT/CA2024/050195 (6 pages).

Möttonen et al., "Transformation of quantum states using uniformly controlled rotations", Quantum Information and Computation, vol. 5, No. 6, pp. 467-473, Sep. 2005.

Schuld, Maria, et al. "Circuit-centric quantum classifiers." Physical Review A 101.3 (2020): 032308.

D. P. Kingma and J. Ba, "Adam: A method for stochastic optimization", CoRR, vol. abs/1412.6980, 2014. [Online]. Available: http://arxiv.org/abs/1412.6980.

* cited by examiner

16 Sample Decimated 2x Parallel Embedded 8 Qubit Run – Final Validation Accuracy

| vs | 8PSK | BPSK | GFSK | PAM4 | QAM16 | QAM64 | QPSK |
|---|---|---|---|---|---|---|---|
| 8PSK | | 0.572 | 0.58 | 0.61 | 0.606 | | 0.562 |
| BPSK | | | 0.636 | 0.558 | 0.65 | 0.568 | 0.576 |
| GFSK | | | | 0.59 | 0.66 | 0.578 | 0.576 |
| PAM4 | | | | | 0.680 | 0.584 | 0.606 |
| QAM16 | | | | | | 0.646 | 0.602 |
| QAM64 | | | | | | | 0.546 |
| QPSK | | | | | | | |

FIG. 10

FIG. 13 — Confusion matrix (values in percent)

| | 8psk | am-dsb | am-ssb | bpsk | gfsk | nbfm | pam4 | qam16 | qam64 | qpsk |
|---|---|---|---|---|---|---|---|---|---|---|
| 8psk |  |  |  |  |  |  |  |  |  |  |
| am-dsb | 82.2 |  |  |  |  |  |  |  |  |  |
| am-ssb | 82.5 | 49.1 |  |  |  |  |  |  |  |  |
| bpsk | 65.8 | 81.3 | 80.7 |  |  |  |  |  |  |  |
| gfsk | 83.8 | 82.3 | 84.6 | 81.3 |  |  |  |  |  |  |
| nbfm | 81.3 | 57.3 | 55.5 | 79.5 | 83.7 |  |  |  |  |  |
| pam4 | 68.4 | 80.8 | 81.4 | 61.8 | 83.1 | 80.6 |  |  |  |  |
| qam16 | 57.0 | 82.7 | 82.6 | 65.6 | 83.4 | 82.2 | 64.7 |  |  |  |
| qam64 | 58.4 | 83.1 | 82.4 | 64.6 | 82.1 | 81.8 | 66.8 | 53.7 |  |  |
| qpsk | 55.2 | 82.6 | 82.4 | 68.0 | 80.4 | 81.6 | 72.0 | 57.6 | 58.0 |  |
| wbfm | 72.5 | 64.5 | 63.9 | 70.3 | 80.6 | 61.0 | 70.4 | 73.3 | 73.2 | 73.6 |

FIG. 13

| | 8psk | am-dsb | am-ssb | bpsk | gfsk | nbfm | pam4 | qam16 | qam64 | qpsk |
|---|---|---|---|---|---|---|---|---|---|---|
| 8psk | | | | | | | | | | |
| am-dsb | 99.7 | | | | | | | | | |
| am-ssb | 99.7 | 76.8 | | | | | | | | |
| bpsk | 99.5 | 99.6 | 99.7 | | | | | | | |
| gfsk | 99.5 | 99.7 | 99.7 | 99.5 | | | | | | |
| nbfm | 99.5 | 97.2 | 97.1 | 99.5 | 98.8 | | | | | |
| pam4 | 99.4 | 99.7 | 99.8 | 99.5 | 99.4 | 99.4 | | | | |
| qam16 | 99.5 | 99.8 | 98.9 | 99.6 | 99.6 | 99.6 | 99.7 | | | |
| qam64 | 99.4 | 99.7 | 99.8 | 99.5 | 99.5 | 99.6 | 99.7 | 99.4 | | |
| qpsk | 99.5 | 99.7 | 99.7 | 99.4 | 99.5 | 99.4 | 99.1 | 99.6 | 99.6 | |
| wbfm | 99.5 | 99.6 | 99.6 | 99.5 | 99.4 | 99.1 | 99.4 | 99.6 | 99.6 | 99.5 |

| num_qubits | 3 | 4 | 5 | 6 | 7 | 8 |
|---|---|---|---|---|---|---|
| num_layers | | | | | | |
| 1 | 57.63 | 60.10 | 59.61 | 59.96 | 60.49 | 59.01 |
| 2 | 63.54 | 63.17 | 63.46 | 63.27 | 63.71 | 63.11 |
| 3 | 64.72 | 65.92 | 66.45 | 64.69 | 63.68 | 63.87 |
| 4 | 65.62 | 68.62 | 67.96 | 65.98 | 64.06 | 62.82 |
| 5 | 65.64 | 68.95 | 68.73 | 65.64 | 63.13 | 62.02 |
| 6 | 66.29 | 69.66 | 70.15 | 67.23 | 63.20 | 62.32 |
| 7 | 66.15 | 70.02 | 71.24 | 68.62 | 63.24 | 62.71 |
| 8 | 66.45 | 69.69 | 71.62 | 70.47 | 64.38 | 63.07 |
| 9 | 66.71 | 70.35 | 72.29 | 70.63 | 65.21 | 63.27 |
| 10 | 66.51 | 69.92 | 72.31 | 71.95 | 65.75 | 63.66 |
| 11 | 66.71 | 70.78 | 72.58 | 72.43 | — | — |
| 12 | 66.88 | 70.29 | 73.08 | 72.81 | — | 64.20 |
| 13 | 66.57 | 70.39 | 73.10 | 73.41 | 69.63 | — |
| 14 | — | 70.86 | 73.49 | 73.24 | — | — |
| 15 | — | 70.67 | 73.23 | 73.56 | 70.31 | 65.07 |

|  | 8psk | am-dsb | am-ssb | bpsk | gfsk | nbfm | pam4 | qam16 | qam64 | qpsk |
|---|---|---|---|---|---|---|---|---|---|---|
| 8psk |  |  |  |  |  |  |  |  |  |  |
| am-dsb | 85.7 |  |  |  |  |  |  |  |  |  |
| am-ssb | 85.3 | 49.8 |  |  |  |  |  |  |  |  |
| bpsk | 60.7 | 84.4 | 83.9 |  |  |  |  |  |  |  |
| gfsk | 82.6 | 85.1 | 85.0 | 79.1 |  |  |  |  |  |  |
| nbfm | 84.7 | 57.6 | 55.9 | 82.6 | 85.4 |  |  |  |  |  |
| pam4 | 64.5 | 84.0 | 85.0 | 56.1 | 79.6 | 83.6 |  |  |  |  |
| qam16 | 55.5 | 85.4 | 85.4 | 62.8 | 83.6 | 83.7 | 61.6 |  |  |  |
| qam64 | 54.1 | 85.5 | 85.6 | 64.8 | 83.3 | 84.3 | 63.3 | 54.6 |  |  |
| qpsk | 55.9 | 85.4 | 85.9 | 60.1 | 83.7 | 84.4 | 62.6 | 54.8 | 55.8 |  |
| wbfm | 74.6 | 66.4 | 67.4 | 72.5 | 80.8 | 63.9 | 73.7 | 73.9 | 74.8 | 74.9 |

FIG. 17

| num_qubits | 4 | 5 | 6 |
|---|---|---|---|
| num_layers | | | |
| 1 | 61.00 | 60.67 | 61.30 |
| 6 | 70.63 | 72.36 | 71.80 |
| 8 | 70.88 | 73.08 | 72.50 |
| 10 | 71.14 | 73.40 | 73.40 |
| 13 | 71.30 | 73.85 | 74.29 |

FIG. 18

| num_qubits | 8W_15L | | | | |
|---|---|---|---|---|---|
| num_epochs | | 5 | 20 | 35 | 50 |
| | | 65.07 | 67.77 | 69.12 | 69.74 |

FIG. 19

QUANTUM MODULATION CLASSIFIER SYSTEM AND METHOD

CROSS REFERENCE TO RELATED APPLICATIONS

This application claims priority to U.S. Application No. 63/450,329, filed Mar. 6, 2023, the contents of which is hereby incorporated by reference in its entirety.

FIELD

The present disclosure relates generally to quantum computing, and, more specifically, to quantum variational classifiers.

BACKGROUND

The following paragraphs are not an admission that anything discussed in them is prior art or part of the knowledge of persons skilled in the art.

Wireless signal datasets contain high dimensionality complex vectors. Processing wireless signals is computationally intensive.

SUMMARY

The following summary is intended to introduce the reader to various aspects of the applicant's teaching, but not to define any invention.

According to some aspects, there is provided a quantum modulation classifier, comprising: a trained quantum variational classifier including a plurality of qubits and comprising: an embedding stage operable to apply a quantum embedding technique to embed a modulated radio signal, a variational stage operable to receive the modulated radio signal from the embedding stage and pass the modulated radio signal through a plurality of variational layers, and a measurement stage operable to receive the modulated radio signal from the variational stage and extract measurement results to classify the modulated radio signal.

In some examples, the quantum variational classifier further comprises a preprocessing module operable to receive the modulated radio signal and apply a preprocessing step to transform the modulated radio signal into a representation that is more suitable for the quantum embedding technique prior to passing the modulated radio signal to the embedding stage.

In some examples, the quantum variational classifier is configured for re-embedding of the modulated radio signal in parallel.

In some examples, the quantum variational classifier is configured for re-embedding of the modulated radio signal in series.

In some examples, the radio signal is a frequency modulated signal.

In some examples, the quantum embedding technique is amplitude embedding.

In some examples, the quantum embedding technique is angle embedding.

In some examples, the variational stage includes at least twenty variational layers.

According to some aspects, there is provided a quantum modulation classifier, comprising: a radio signal receiver operable to measure a modulated radio signal; and a trained quantum variational classifier communicatively coupled to the radio signal receiver to receive the modulated radio signal, the quantum variational classifier including a plurality of qubits and comprising: an embedding stage operable to apply a quantum embedding technique to embed the modulated radio signal, a variational stage operable to receive the modulated radio signal from the embedding stage and pass the modulated radio signal through a plurality of variational layers, and a measurement stage operable to receive the modulated radio signal from the variational stage and extract measurement results to classify the modulated radio signal.

In some examples, the quantum variational classifier further comprises a preprocessing module operable to receive the modulated radio signal and apply a preprocessing step to transform the modulated radio signal into a representation that is more suitable for the quantum embedding technique prior to passing the modulated radio signal to the embedding stage.

In some examples, the quantum variational classifier is configured for re-embedding of the modulated radio signal in parallel.

In some examples, the quantum variational classifier is configured for re-embedding of the modulated radio signal in series.

In some examples, the modulated radio signal is a frequency modulated signal.

According to some aspects, there is provided a quantum modulation classification method, comprising: receiving a modulated radio signal; embedding the modulated radio signal using an embedding stage of a quantum variational classifier; passing the embedded modulated radio signal through a variational stage of the quantum variational classifier; extracting measurement results from the embedded modulated radio signal passed through the variational stage using a measurement stage of the quantum variational classifier; and classifying the modulated radio signal using the measurement results.

In some examples, the quantum modulation classification method further comprises applying a preprocessing step to transform the modulated radio signal into a representation that is more suitable for the quantum embedding technique prior to embedding the modulated radio signal.

In some examples, the quantum modulation classification method further comprises re-embedding the modulated radio signal in parallel.

In some examples, the quantum modulation classification method further comprises re-embedding the modulated radio signal in series.

In some examples, embedding the modulated radio signal includes performing amplitude embedding of the modulated radio signal.

In some examples, embedding the modulated radio signal includes performing angle embedding of the modulated radio signal.

BRIEF DESCRIPTION OF DRAWINGS

The drawings included herewith are for illustrating various examples of articles, methods, and apparatuses of the present specification and are not intended to limit the scope of what is taught in any way. In the drawings:

FIG. 10 is a chart of results from the second experimental quantum modulation classifier of FIG. 9;

FIG. 13 is a chart of results from another experimental quantum modulation classifier;

FIG. 14 is a chart of results from another experimental quantum modulation classifier;

FIG. 16 is a chart of results from further experimental quantum modulation classifiers;

FIG. 17 is a chart of results from an experimental quantum modulation classifier of the group from which results are shown in FIG. 16;

FIG. 18 is a chart of results from a subset of the experimental quantum modulation classifiers of FIG. 16;

FIG. 19 is a chart of results from one of the experimental quantum modulation classifiers of FIG. 16;

Figure 1:
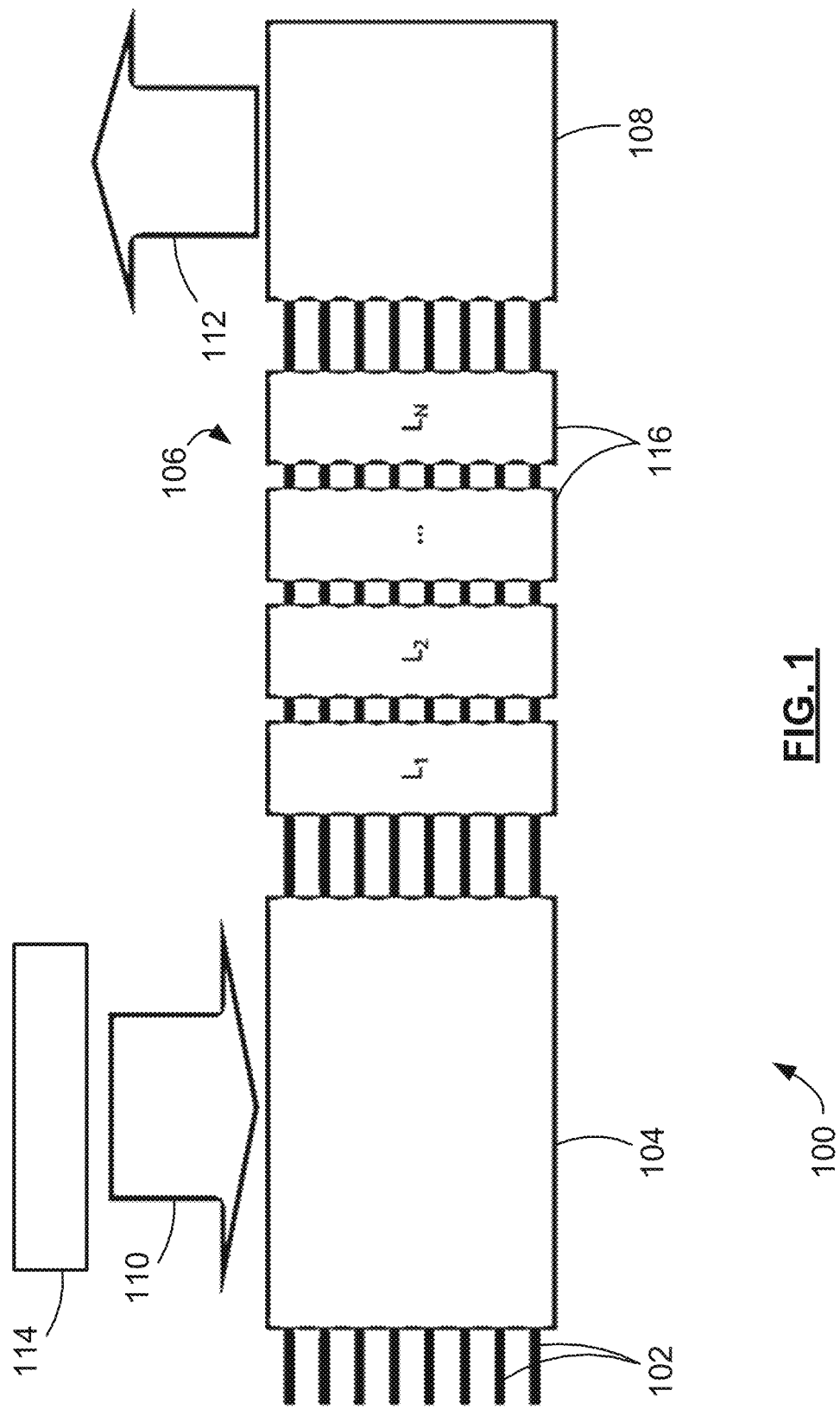
FIG. 1 is a schematic diagram of a first quantum modulation classifier, according to an embodiment.

The drawings included herewith are for illustrating various examples of apparatuses and methods of the teaching of the present specification and are not intended to limit the scope of what is taught in any way.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed invention is not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Examples of the present disclosure relate to wireless and radiofrequency signal processing. Where information is sent or received via a wireless channel, such as a cell tower relaying a message to the recipient's smartphone, an aircraft's radar probing for the runway, or a space probe returning data from the outer solar system via the Deep Space Network; wireless signal processing can be used in recovering the information in any such transmission despite noise, fading, interference or other impairments. The wireless domain is changing, with an ever-growing number of users and an increasing number of applications which compete for a limited range of frequency spectrum.

Any two users transmitting on the same frequency at the same time will interfere with each other, and neither will be able to effectively transfer information. Interference is a fundamental problem in wireless, and the need to avoid interference has been reflected in the law and operating procedures of radio communication for over a century. One subdomain of wireless signal processing is Cognitive Radio, which is the concept of intelligent wireless devices that are able to observe and learn about their spectral environment, coordinate with other spectrum users to avoid interference, and make informed decisions to use their spectrum allocation as efficiently as possible. Development and usage of cognitive radio techniques may allow for more users to effectively share the same spectrum and alleviate interference concerns. An important component of cognitive radio is spectrum sensing, which can be described briefly as the task of automatically listening for and identifying signal sources in the environment such as other spectrum users.

One aspect of wireless signals is their modulation, which is the algorithm used to encode information onto a radio transmission. A signal can't be decoded until its modulation is known. The task of determining the modulation of an unknown signal is known as Modulation Recognition. Since the modulation affects several measurable characteristics of a signal (such as its bandwidth, spectral power density, dynamic range etc) a short recording of the unknown signal is usually sufficient to determine its modulation without any other a priori knowledge. Modulation recognition can be considered an entry point problem for spectrum sensing and cognitive radio in general, because techniques that rely on the information content of a signal use knowledge of the modulation being used. Software-defined radio (SDR) receivers produce digitized recordings of RF signals that are amenable to digital signal processing and machine learning techniques.

The teachings described herein relate to quantum computing. In some examples, information is represented in the states of an artificial quantum system, and computations on the information are accomplished by modifying the state in a controlled way according to the laws of quantum mechanics. In some examples, features of quantum mechanics such as superposition and entanglement are exploited. In some examples, this leads to performing algorithms with a lower computational complexity than conventional (classical) computers, with corresponding dramatic speedups in the relevant algorithms. In some examples, an increased number of qubits is used to increase the total amount of information that may be simultaneously stored and operated on by the machine. In some examples, a selected error correction is included to provide a selected usable lifetime of the quantum state before it is corrupted by an accumulation of noise.

In some examples, the teachings described herein relate to quantum computing using a quantum variational classifier. The quantum variational classifier may be a quantum circuit that can be trained from labeled data to classify new data samples. In some examples, a Quantum Variational Classifier (QVC) uses trainable quantum circuits in an analogy to training a neural network to perform practical classification tasks. In some examples, even with only a handful of qubits and severe limitations in the depth of the circuit (number of serial operations in the quantum computer), a trained QVC is capable of distinguishing and classifying a broad range of data inputs.

Classification can be expressed as the task of taking some data sample x, inspecting it, and assigning it an appropriate label y from a set of possible labels Y according to the chosen classification function y=F (x). Since F (x) may be difficult to construct analytically, the classification function may be approximated with an ML model $f(x, \theta)$ such that $f(x, \theta) \approx F(x)$ for some choice of model parameters $\theta$; these parameters are obtained by training the model on a labeled dataset according to a training routine. In the machine learning field, the sample (also referred to as an input sample herein) may be any single input x to a machine learning model. In the software defined radio (SDR) field, a sample (also referred to as an IQ sample herein) may be a single complex valued point measured at a specific time.

For an input sample vector x composed of $\Gamma$ complex valued elements, in some examples, the quantum variational classifier requires a quantum computer of n qubits, where $n \geq \log 2(\Gamma)$. In some examples, the quantum circuit of a quantum variational classifier includes three major components: an embedding stage $S_x$, a parameterized trainable circuit $U_\theta$, and a measurement stage.

In some examples, the embedding stage $S_x$ creates a quantum state representing the input sample vector $x \in C^\Gamma$, by transforming the initial state $|0\rangle \otimes |0\rangle \ldots \otimes |0\rangle$ to the state $|\varphi(x)\rangle = S_x |0\rangle \otimes |0\rangle \ldots \otimes |0\rangle$ which is now dependent on x. A number of different techniques may be used for this purpose, in some examples representing a trade-off between circuit depth and the number of qubits required to represent all elements of the input sample vector x. In some examples, the circuit employs Amplitude Embedding, which maps each element of x to an amplitude of the quantum state vector $|\psi(x)\rangle$. Since a quantum state of n qubits is represented by a vector of $2^n$ amplitudes, this allows for the embedding of x in a number of qubits that is logarithmic in the length of x and is the source of the $n \geq \log 2(\Gamma)$ condition. To prepare $|\varphi(x)\rangle$, in some examples the arbitrary state preparation algorithm developed by Möttönen et al., "Transformation of quantum states using uniformly controlled rotations," *Quantum Information and Computation*, vol. 5, no. 6, pp. 467-473, September 2005, which is hereby incorporated by reference, is used.

In some examples, the parameterized trainable circuit $U_\theta$ largely instantiates the classification function on the input state $|\varphi(x)\rangle$. A circuit ansatz L(w) parameterized by a weight vector denoted w is selected. For example, the StronglyEntanglingLayers™ circuit provided with PennyLane™ may be used. This ansatz is applied repeatedly 1 times, with each repetition of L(w) parameterized by its own weight vector, resulting in the state $L(\theta_l) \ldots L(\theta_2)$ $L(\theta_1)|\varphi(x)\rangle = U_\theta|\varphi(x)\rangle$. The model parameters $\theta$ associated with $U_\theta$ may be initially set to random values, but may be adjusted via the training procedure such that the amplitudes of the state $U_\theta|\varphi(x)\rangle$ encode the model's predictions.

The measurement stage may be where the quantum state $U_\theta|\varphi(x)\rangle$ is measured in the computational basis, producing a readout that is used to assign a predicted label $y \in Y$ to the input sample x. In some examples, each distinct possible measurement label is assigned to one qubit out of the n available qubits in the quantum computer, and the qubit with the highest magnitude of expectation value for observable $\sigma_Z$ (i.e. the Pauli Z matrix) is chosen as the model's prediction y for a given data sample x. This imposes a further restraint that $n \geq |Y|$. In some examples, binary classification is investigated, so $|Y|=2$ and therefore $n \geq 2$. When the QVC algorithm is run on a simulated quantum computer, in some examples the measurement stage comprises or consists of calculating the measurement expectation values of each qubit directly from the simulated quantum state $U_\theta|\varphi(x)\rangle$, whereas on a real quantum computer the state $U_\theta|\varphi(x)\rangle$ may need to be prepared and measured repeatedly in order to estimate the expectation values of each qubit to a high degree of confidence before assigning label y.

In some examples, after the measurement stage, all measurement results are in the classical domain rather than in the quantum domain and thus classical post-processing techniques may be applied, e.g. to compensate for known errors in the measurement process.

In some examples, prior to the embedding stage, classical preprocessing operations may be applied to the input x, e.g. to emphasize pertinent features in the input. Note that if an input sample x has too many elements to be embedded on a given number of qubits, i.e. $n < \log 2(\Gamma)$, then a new input x' may be constructed such that its length is compatible with the number of qubits. For example, x may be truncated at the 2n th element, such that $n=\log 2(\Gamma')$ satisfies the constraint on the input length. However, this may have the effect of discarding information in the sample, which may result in a loss of accuracy.

In some examples, the quantum variational classifier is applied to the problem of modulation recognition. In some examples, quantum machine learning techniques are applied to the modulation recognition task. In some examples, quantum machine learning techniques are applied to the wireless signal processing domain in general and/or radio signal classification. In some examples, the modulation of a signal is classified directly from complex-valued time series recordings (which may be referred to as baseband IQ).

The quantum variational classifier receives radio signals. The radio signals may be modulated and/or impaired radio signals, such as any of the radio signals disclosed elsewhere herein. The radio signals may be received from a database, and may be measured or synthesized radio signals. In some embodiments, the quantum variational classifier is part of a system including a radio signal receiver and is communicatively coupled to the radio signal receiver to receive radio signals therefrom. The radio signals may be received directly from the radio signal receiver or indirectly from the radio signal receiver (e.g., first stored in a database and then sent to or retrieved by the quantum variational classifier).

The quantum variational classifier uses quantum embedding to represent the signal as quantum states. In some examples, the quantum variational classifier uses an amplitude encoding technique. Data may be encoded into the amplitudes of a quantum state.

FIG. 1 illustrates a quantum variational classifier 100 with a plurality of qubits 102 (e.g., eight qubits). In some embodiments, the number of qubits 102 is at least three. In some embodiments, the number of qubits 102 is at least four. The inventors have discovered that four or more qubits improves performance. In some embodiments, the number of qubits 102 is at least eight. In some embodiments, the number of qubits is at least sixteen (e.g., when using angle embedding). The quantum variational classifier 100 includes an embedding stage 104, a variational stage 106 (which may also be referred to as a parameterized trainable circuit herein), and a measurement stage 108. Input 110 is provided to the quantum variational classifier 100 (e.g., to the embedding stage 104) and processed to generate output 112 from the quantum variational classifier (e.g., from the measurement stage 108).

In some examples, the primary configurable features of the quantum variational classifier include: 1) Classical preprocessing—which can include, e.g., decimation, filtering, truncation, and the use of a deep learning model for input-data conversion; 2) Input vector length $\Gamma$, e.g., according to the bound set by number of qubits n; 3) Number of layers l; and 4) Measurement methodology based on the number of measurement labels |Y|. In some examples, there exist other configurable features which can include: 1) Number of training epochs; 2) Training hyperparameters, optimized or manually configured; and 3) Data re-embeddings.

The input 110 may be or include a plurality of input samples (e.g., time-series IQ samples). In some examples, the input 110 may be frequency modulated, AM-double sideband, AM single sideband, Wideband frequency Modulated, Narrowband frequency Modulated, Binary phase shift keying, Quadrature phase shift keying, 8-phase shift keying (8psk), Pulse Amplitude Modulation—8, Quadrature Amplitude Modulation (16), Quadrature Amplitude Modulation (64), Gaussian frequency shift keying, and/or continuous phase frequency shift keying. In some examples, the input 110 may be synthetic (e.g., for training). In some examples, the input may be subjected to a channel model (e.g., dynamic, additive white gaussian noise, unimpaired). The input 110 may include digital and/or analog modulated waveforms. The input 110 may be generated (e.g., measured) by a radio signal receiver 114 (i.e., not synthetic). The output 112 may be a label for each of the input samples. The output 112 may include a classification of the modulation of the input 110.

Raw input may be embedded, or, as described further elsewhere herein, raw input may be preprocessed before being embedded. The embedding stage 104 implements one or more quantum embedding techniques. The embedding stage 104 may implement amplitude embedding (e.g., by way of Mottonen state preparation). The embedding stage may implement angle embedding.

In some examples, the input vector that can be embedded is dictated by the number of qubits available. For example, 4 qubits can embed examples that are up to 2×16 real values, 5 can embed 2×32, 6 can embed 2×64, and so on. In some examples, since the amplitude embedding stage can accept complex inputs, the 2×$\Gamma$ R-valued input from the dataset is reshaped to a 1×$\Gamma$ C-valued vector and normalized prior to the embedding stage.

The variational stage 106 may have a single layer 116 (e.g., a trainable layer). However, a single layer may not perform well. The variational stage 106 may include a plurality of layers 116 (e.g., a plurality of trainable layers). In some embodiments, the variational stage 106 includes at least two layers 116. In some embodiments, the variational stage 106 includes at least four layers. The inventors have discovered that the performance starts to improve at four layers. A layer 116 may implement an operation (e.g., an arbitrary rotation) on every qubit 102 and an engagement of every qubit (e.g., an entanglement with its neighbor).

Once the quantum circuit progresses through the trainable layers (e.g., several trainable layers in some examples), the circuit may be measured. The measurement stage 108 extracts measurement results. The measurement stage 108 may extract expectation values. The measurement stage 108 may be used to assign a label to an input sample. The quantum variational classifier may be a trained classifier. For example, the quantum variational classifier may be a classifier trained using modulated radio signals labeled with classification information. The quantum variational classifier may be trained using a range of machine learning techniques and optimization algorithms (e.g., gradient decent or stochastic gradient decent such as the Adam algorithm). In some examples, the measurement stage 108 dictates the type of problem the model would be configured for (e.g., One class, binary classification, multi-class classification).

In some examples, a measurement mechanism for obtaining a classification result has one qubit assigned to each classification label under consideration. The expectation value of each qubit can be measured after the variational stage(s) has been applied. After the variational stage(s) has been applied, the expectation values of the qubits are measured and the qubit with the highest expectation value is the classification label output. In these examples, one qubit measured is one class, two measured is binary classification, and three or more is multi-class classification. The number of classes is equal to the number of qubits.

In some examples for multi-class classification, the equivalent output of a string of qubits results in a binary string (e.g., if a six qubit measurement returns 110100, the classifier has identified class 52 of a possible 64). The number of qubits measured may determine the number of classes that are possible. In some examples, $2^N$, where N is the number of qubits measured, is equal to the number of classes that are possible. In these examples, we may not be looking directly at expectation values.

In some examples, the choice of mechanism for measurement does not affect the training process, it affects what the variational layers themselves are trained to do. In other words, the variational layers are trained for a different function between one measurement method and another.

Figure 2:
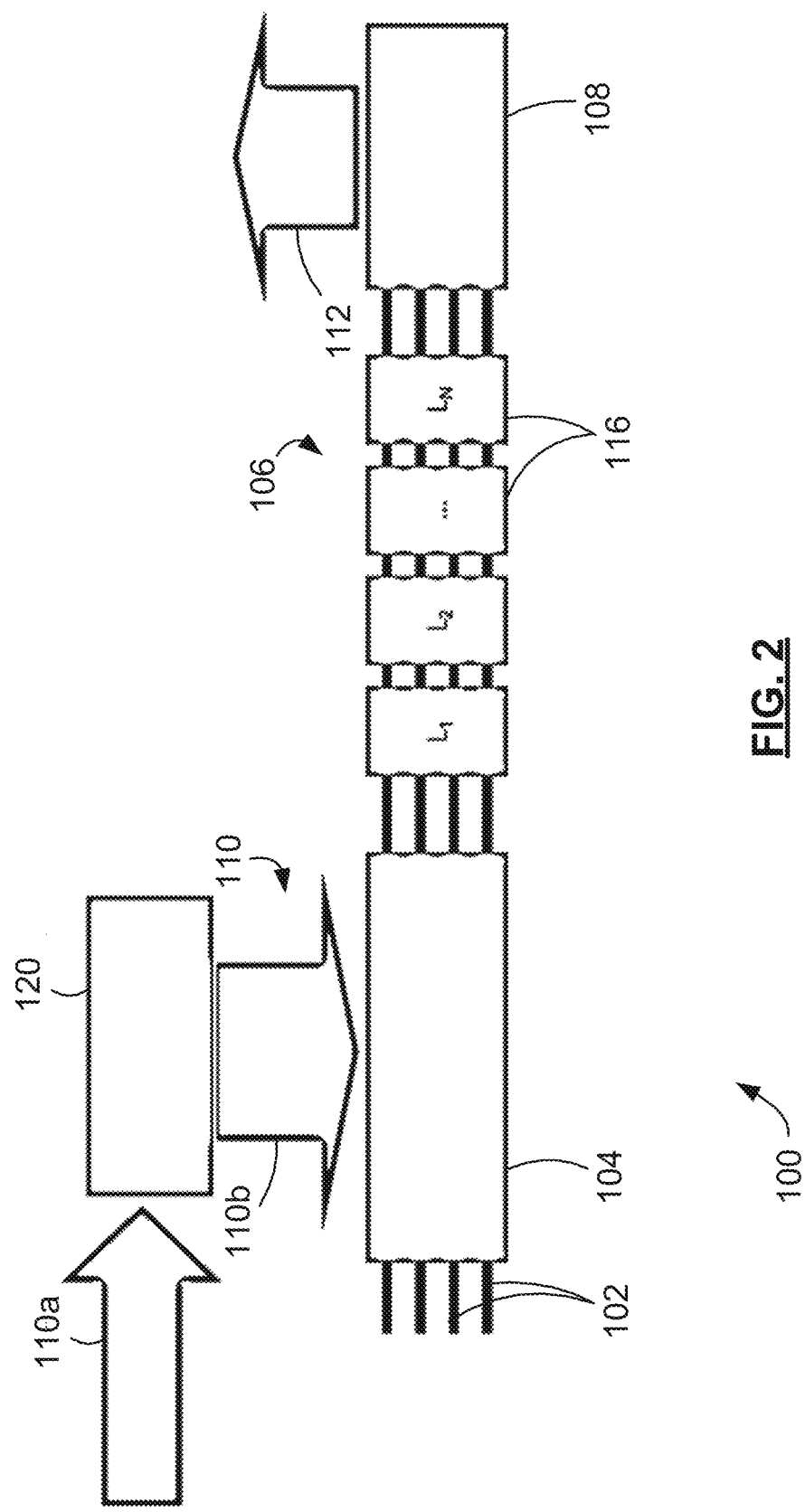
FIG. 2 is a schematic diagram of a second quantum modulation classifier, according to an embodiment, incorporating a preprocessing module.

Referring now to FIG. 2, the quantum variational classifier 100 may include a preprocessing module 120. The preprocessing module 120 may perform one or more preprocessing steps on an initial input 110a (e.g., a raw input) to generate an embedding stage input 110b. The preprocessing steps may include, e.g., steps performed for data loading and/or ingestion for deep learning systems. The preprocessing steps may include different windowing functions, filtering the signal, wavelet decomposition, compression, and/or ingesting/training with different batch sizes.

In some embodiments, the preprocessing module 120 truncates the input 110a to a pre-determined number of samples. Truncation may allow a reduction in the qubit needs. In some embodiments, the preprocessing module 120 decimates the input 110a. In some embodiments, the preprocessing module 120 downsamples the input. Downsampling the input reduces the number of samples in an initial input 110a to a reduced number of samples included in the embedding stage input 110b. The downsampling module 120 may, e.g., retain only every x sample, where x is a whole number (e.g., eight). Downsampling may reduce the required depth of the circuit and the number of qubits needed.

In some embodiments, the preprocessing module 120 uses feature extraction using unsupervised methods to simplify the problem for the later stages of the quantum variational classifier (e.g., transform the modulated radio signal into a representation that is more suitable for a quantum embedding technique). In some embodiments, the preprocessing module 120 reduces a dimensionality of the input and/or produces a tabular feature matrix. In some embodiments, the preprocessing module 120 uses a neural network to reduce dimensionality. In some embodiments, the preprocessing module 120 uses a neural network to produce a tabular intermediary (e.g., a tabular feature matrix). In some embodiments, the preprocessing module 120 uses a quantum input layer to reduce dimensionality or produce a tabular feature matrix. Neural network preprocessing may be supervised or unsupervised.

Figure 3:
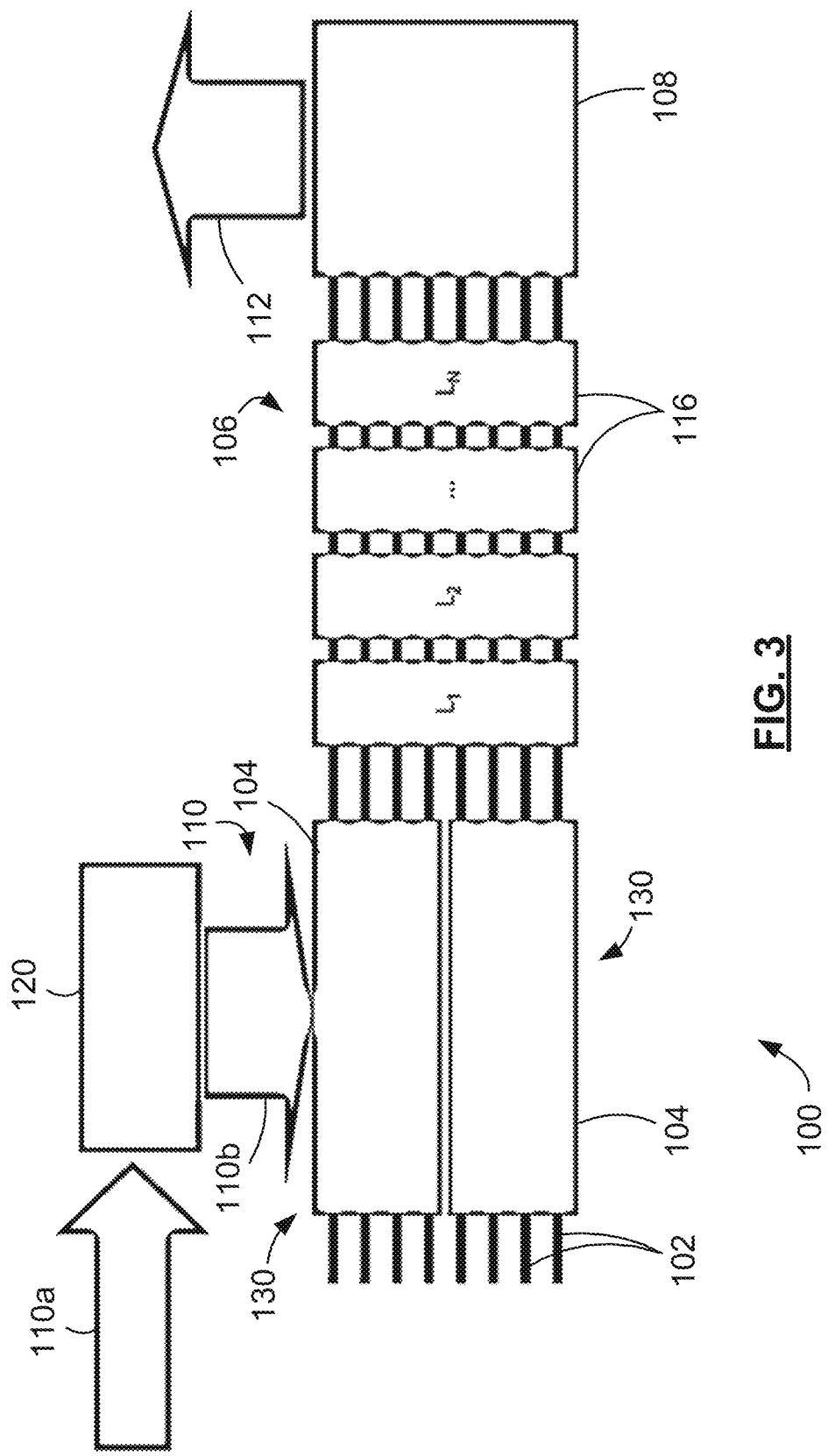
FIG. 3 is a schematic diagram of a third quantum modulation classifier, according to an embodiment, incorporating parallel re-embedding.
Figure 4:
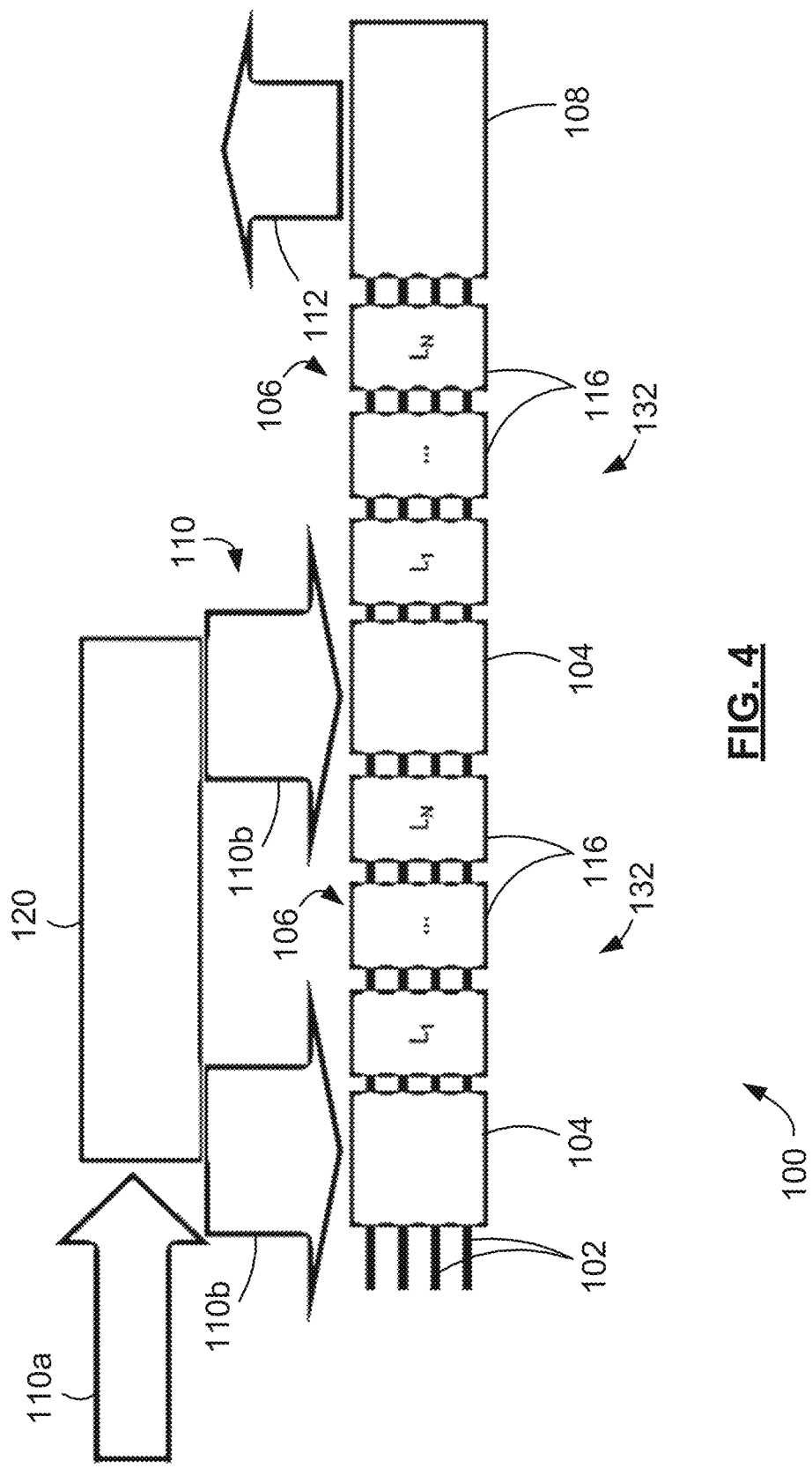
FIG. 4 is a schematic diagram of a fourth quantum modulation classifier, according to an embodiment, incorporating re-embedding in series.

Referring now to FIGS. 3 and 4, the quantum variational classifier 100 may be designed for re-embedding, in which the input 110 is embedded in parallel (FIG. 3) and/or serially (FIG. 4).

As exemplified in FIG. 3, the plurality of qubits 102 may be arranged in a plurality of sets 130, with the input 110 embedded in parallel on each set. While two sets 130 are shown in FIG. 3, in other embodiments more than two sets 130 may be provided, such as three, four, or five sets 130 in parallel.

As exemplified in FIG. 4, the quantum variational classifier 100 may include a plurality of embedding stages 104 and variational stages 106, arranged in a plurality of units 132 in series, with each unit 132 including a variational stage 106 following an embedding stage. The input 110 is embedded in series at each embedding stage 104. While two units 132 are shown in FIG. 4, in other embodiments more than two units 132 may be provided, such as three, four, or five units 132 in series.

Figure 5:
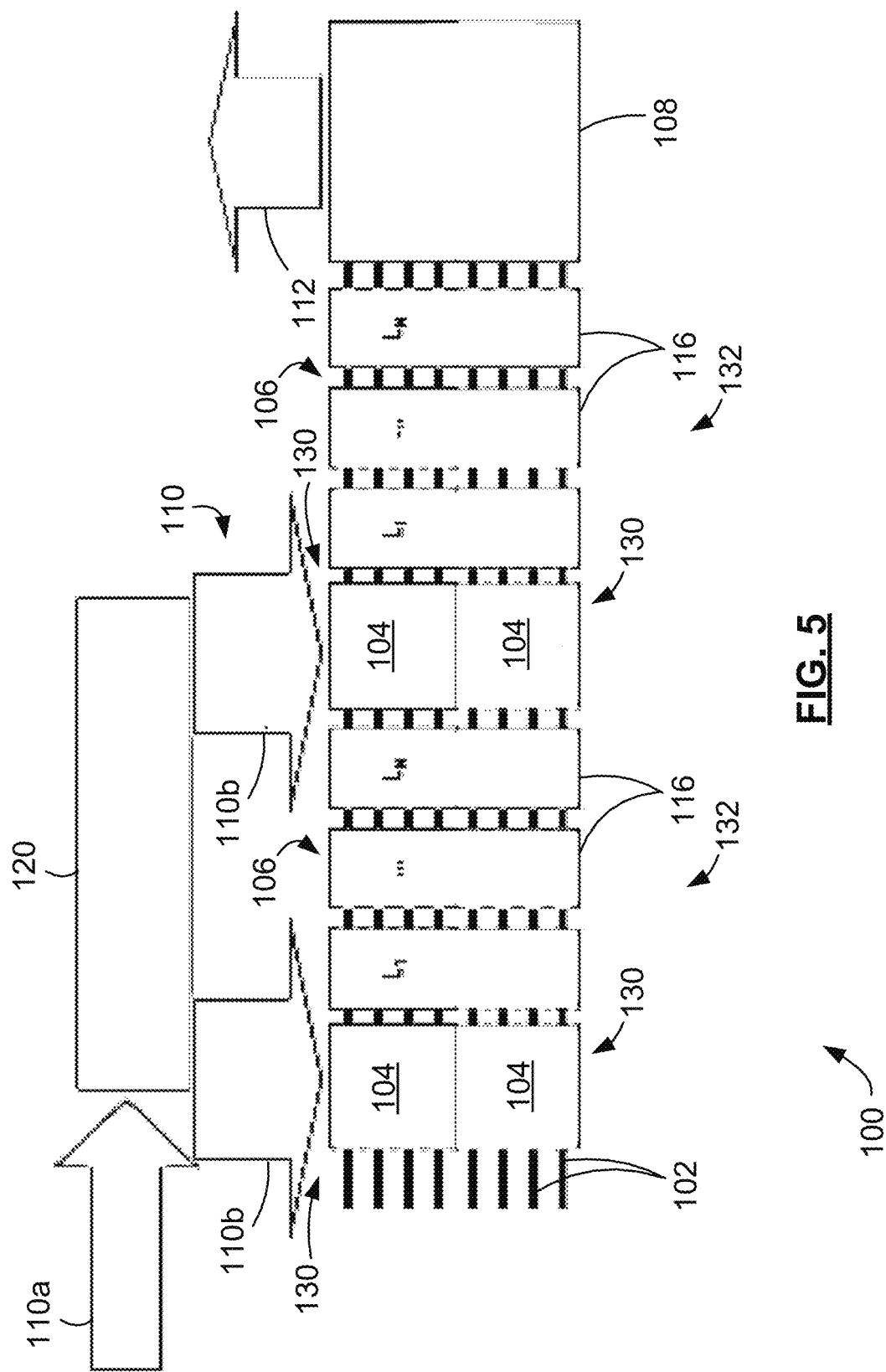
FIG. 5 is a schematic diagram of a fifth quantum modulation classifier, according to an embodiment, incorporating re-embedding in parallel and in series.

As exemplified in FIG. 5, the quantum variational classifier 100 may be designed for both parallel and serial re-embedding.

In some embodiments, accuracy is improved by increasing the amount of input data used, increasing the training time, increasing the number of qubits, and/or increasing the number of variational layers for a variational stage. The inventors have discovered that, in some examples, increasing the number of qubits does not increase accuracy as this would require more training.

Figure 6:
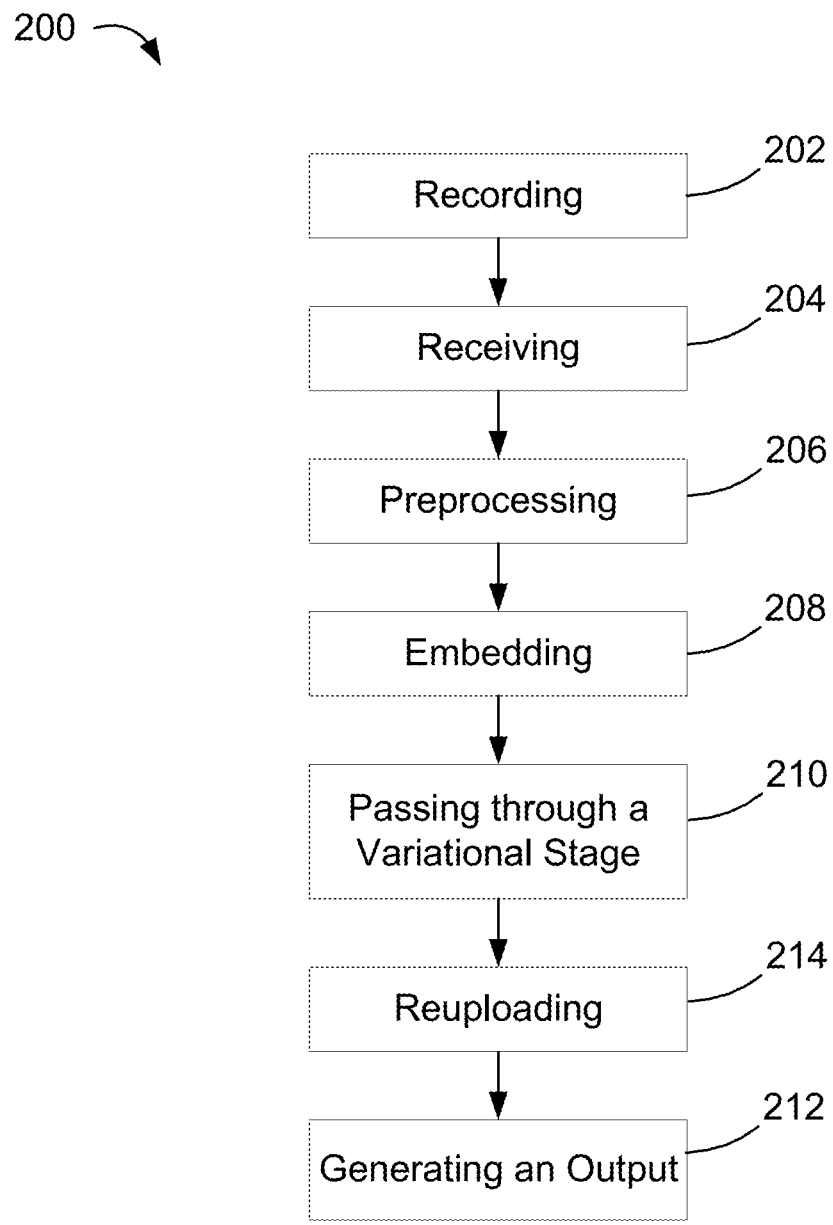
FIG. 6 is a flow chart of a quantum modulation classification method, according to an embodiment.

Referring now to FIG. 6, illustrated is a flow chart of a method 200 of quantum variational classification. The method 200 may be performed with one of the quantum variational classifiers 100 described herein.

In some embodiments, at least five, six, or ten parallel reuploads are used. In some embodiments, at least five, six, or ten reuploads in series are used.

At step 202, method 200 may include recording a radio signal. The radio signal may be recorded using a radio signal receiver (e.g., receiver 114).

At step 204, method 200 includes receiving the radio signal at a quantum variational classifier. Method 200 may also include, at step 206, preprocessing (e.g., downsampling or truncating) the radio signal to generate an input. At step 208, the radio signal or preprocessed input is embedded using an embedding stage of the quantum variational classifier. At step 210, the embedded signal is passed through a variational stage. At step 212, a measurement stage generates an output. Step 212 may include extracting expectation values.

In some embodiments, method 200 includes, at step 214, reuploading the radio signal or preprocessed input. Step 214 may be performed as a parallel or serial reuploading. For example, step 214 may include an embedding step performed in parallel with step 218 or an embedding step performed after step 210 but before step 212.

EXAMPLES

The following non-limiting examples are illustrative of the present application:

Example 1—Dataset

A synthesized dataset of modulated and impaired radio signals was used. The dataset was the radioML2016.10a dataset from DeepSig™. The radioML2016.10a dataset includes the following classes of digital and analog modulated waveforms: AMSSB, AMDSB, WBFM, BPSK, QPSK, 8PSK, QAM16, QAM64, GFSK, CPFSK, PAM4.

The radioML2016.10a dataset was subjected to the Dynamic Channel Model from GNU Radio™ to emulate over-the-air impairments: carrier frequency offset, sample rate offset, additive gaussian white noise (AGWN), doppler shift, frequency selective fading, Rican and Raleigh line-of-sight (LOS), and propagation delay. Signal-to-noise ratio (SNR) of AGWN was variable from −18 decibels to +18 decibels.

The dataset was a file containing dictionaries of multiple classes. A class was a three dimensional array of dimension 1000 by 128 by 2. The file structure was serialized binary, using Pickle™. Each class was a Python™ dictionary of tuples, each tuple was a string and Numpy™ ndarrays. The data was stored in a key-value database wherein the key was a class label and the value was a tuple. The tuple included a tuple string and a tuple ndarray, the tuple string was a single-to-noise ratio value and the tuple ndarray was a ndarray of multiple waveforms of the same class. As noted above, each ndarray had dimension 1000 by 128 by 2: 1000 slices of a continuous time-series signal, 128 time-series points in each slice, and 2 channels one each of real and imaginary (I and Q) components of the complex-valued signal. A dataset sample was a two dimensional array of dimension 2 by 128, or 1 of the 1000 slices. A sample point was a one dimensional array of length 2, or 1 of the 128 columns of a data sample.

Example 1—Quantum Variational Classifier

The dataset was used with a quantum variational circuit developed for binary classification (Schuld, Maria, et al. "Circuit-centric quantum classifiers." *Physical Review A* 101.3 (2020): 032308, which is hereby incorporated by reference). The quantum variational circuit was applied to pairwise combinations of classes from the dataset.

An embedding stage was developed. Amplitude embedding techniques were used to put classical data into a quantum system. Each dataset sample had 128 sample points, complex-valued floating point (or 2 real-valued float). At least a seven qubit system was needed or decimation of sample points would be required to embed the dataset sample. The amplitude embedding was preformed using qml.AmplitudeEmbedding (from PennyLane™) or qml.MottonenStatePreparation (from PennyLane™). Using qml.AmplitudeEmbedding allows study of the behavior of the quantum system on classical data in absence of a widely adopted real-world embedding technique but cannot be implemented in hardware. Using qml.MottonenStatePreparation allows implementation in hardware and requires fewer qubits than other methods (such as angle embedding) to embed given the length of the floating point vector, but has a high circuit depth and complexity. For some results, the embedding stage was repeated in series and/or in parallel to improve expressivity.

A variational stage was developed using multiple qml.StronglyEntanglingLayers (from PennyLane™) templates containing trainable classical parameters and entangling gates, applied to all qubits.

A layered structure was developed for some results, comprising one embedding stage followed by one variational stage or a plurality of variational stages. Multiple layers of this sort may be employed.

A classical optimizer to update trainable parameters was used, including batched stochastic gradient descent (SGD) with momentum and Adaptive Gradient Algorithm (Adagrad). A parameter shift rule was used in place of backpropagation.

A measurement stage was developed in which exact expectation values for a Z basis measurement were used to assign a label to a sample.

For the training process, the dataset was split into training and validation sets. A classical optimizer (Adagrad) calculated parameter shift based on the quantum variational classifier circuit gradient. The optimizer updated variational parameters in qml.StronglyEntanglingLayers. The quantum variational classifier circuit was called with training samples as input. The quantum variational classifier circuit measurement was evaluated, and a cost and accuracy assigned. Then the validation set was used to check that the training was having the desired result (i.e., that the model was learning to perform the desired classification function).

Example 1—Variation 1—Results

Figure 7:
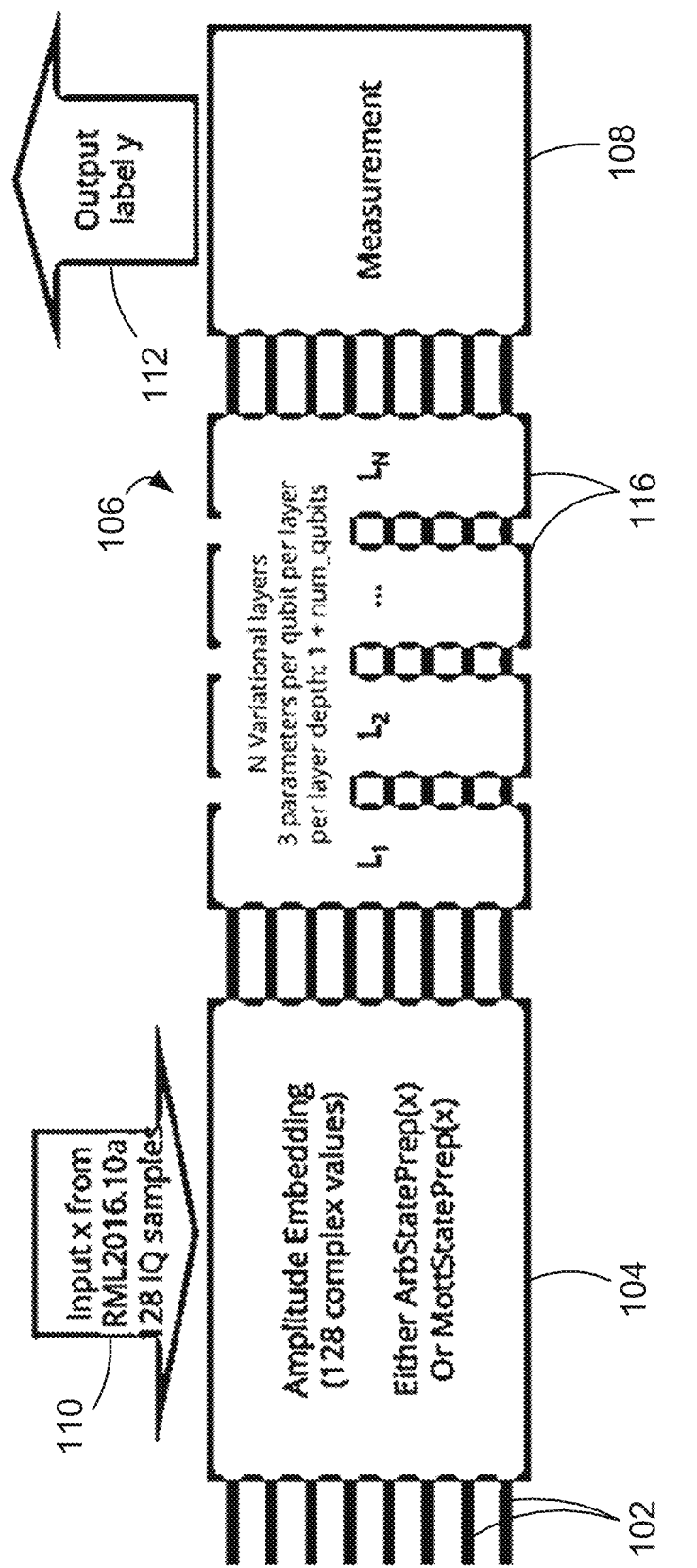
FIG. 7 is a schematic diagram of a first experimental quantum modulation classifier.
Figure 8:
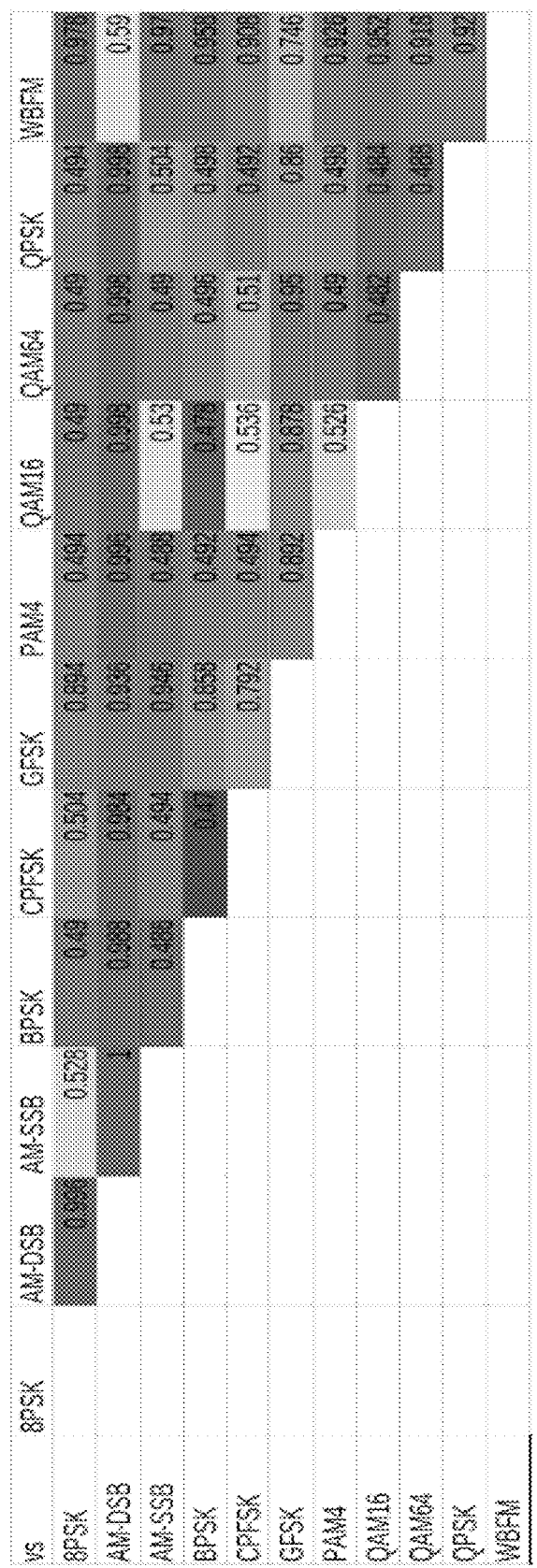
FIG. 8 is a chart of results from the first experimental quantum modulation classifier of FIG. 7.

The quantum variational classifier 100 exemplified in FIG. 7 was used. As exemplified in FIG. 8, certain modulation pairs converged to very high accuracy both in training and validation. As may be seen from FIG. 8, any modulation pairs involving AM-DSB, WBFM and GFSK achieved high validation accuracy. However, most digital modulations did not work with each other: limited expressivity.

Several experiments were performed, with the hope of overcoming the expressivity limitation, including by increasing training time, increasing the number of variational layers, increasing the number of qubits, and changing embedding techniques (e.g., zero-padding, copy concatenation). However, none of these experiments showed a significant effect on expressivity; the same modulation pairs always converged to a high accuracy and the others failed to converge.

Example 1—Variation 2—Results

Figure 9:
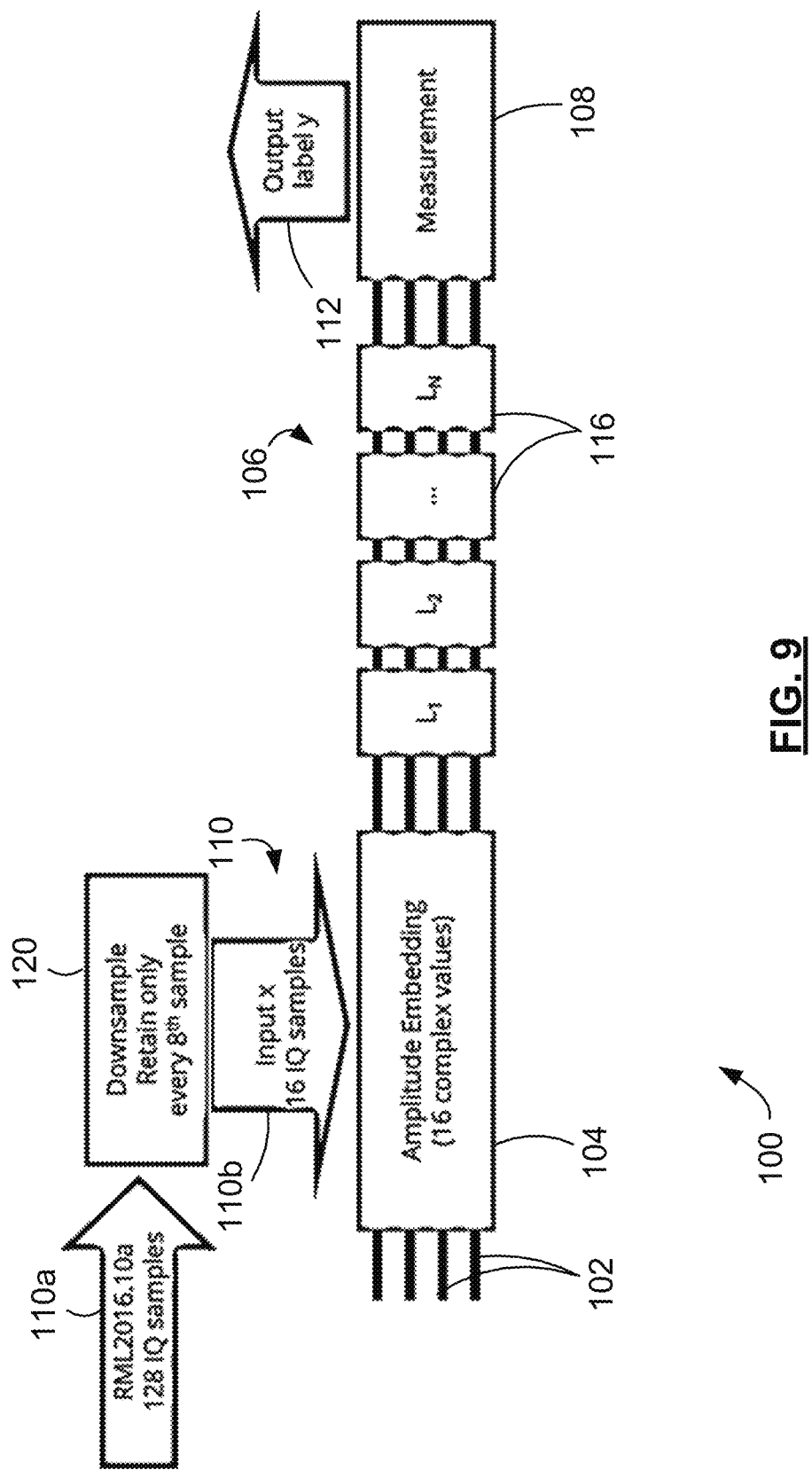
FIG. 9 is a schematic diagram of a second experimental quantum modulation classifier.

The quantum variational classifier 100 exemplified in FIG. 9 was used, incorporating a downsampling module 120. The downsampling applied a decimation factor of eight, reducing the number of points to be embedded from 128 to 16. This reduced the number of qubits required for a single embedding from 7 to 4. This decreased the circuit depth substantially from 502 to 26.

As exemplified in FIG. 10, the result is similar as the 7 qubit, 128 point case, with a small overall decrease in accuracy but substantially similar patterns emerging in the output. The same modulation pairs as for FIGS. 7 and 8 converged to a high accuracy, indicating that the decimated embedding works similarly to the original non-decimated embedding.

With the decimation strategy validated, multiple data embeddings are more practically feasible. With decimation, information is lost but the overall structure is preserved. Important features of the data samples are still visually distinct when plotted as time series.

Example 1—Variation 3—Results

Figure 11:
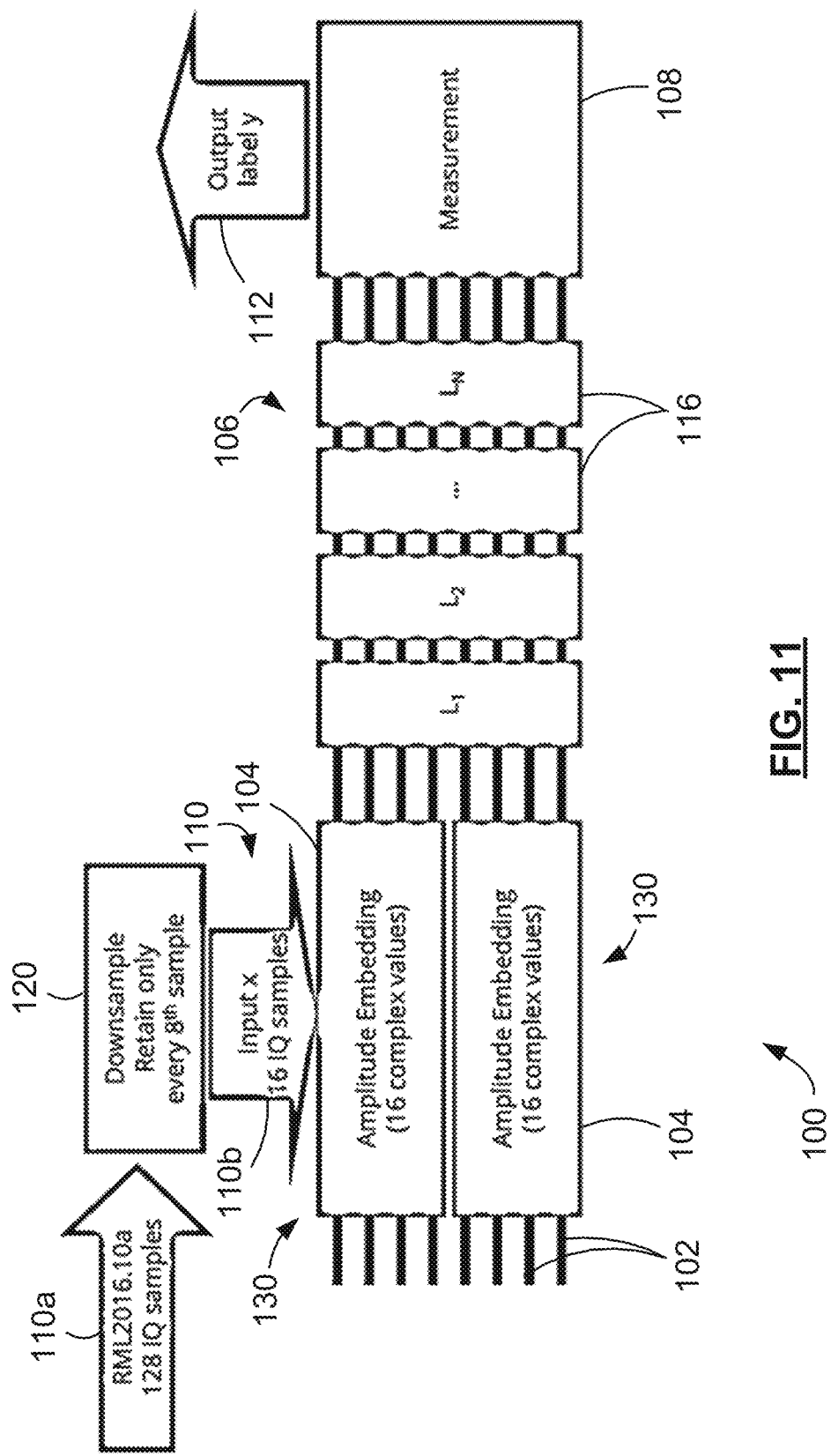
FIG. 11 is a schematic diagram of a third experimental quantum modulation classifier.

The quantum variational classifier 100 exemplified in FIG. 11 was used, incorporating a downsampling module 120 and two parallel embeddings. Eight qubits were needed; two downsampled embeddings in parallel (each acting on 4 qubits).

Using the classifier exemplified in FIG. 11, all modulation pairs converged to a validation accuracy higher than 50%, ranging mostly from 55-65%. This general increase in accuracy indicates that the expressivity has been improved due to the multiple embeddings.

Example 1—Variation 4 Results

Figure 12:
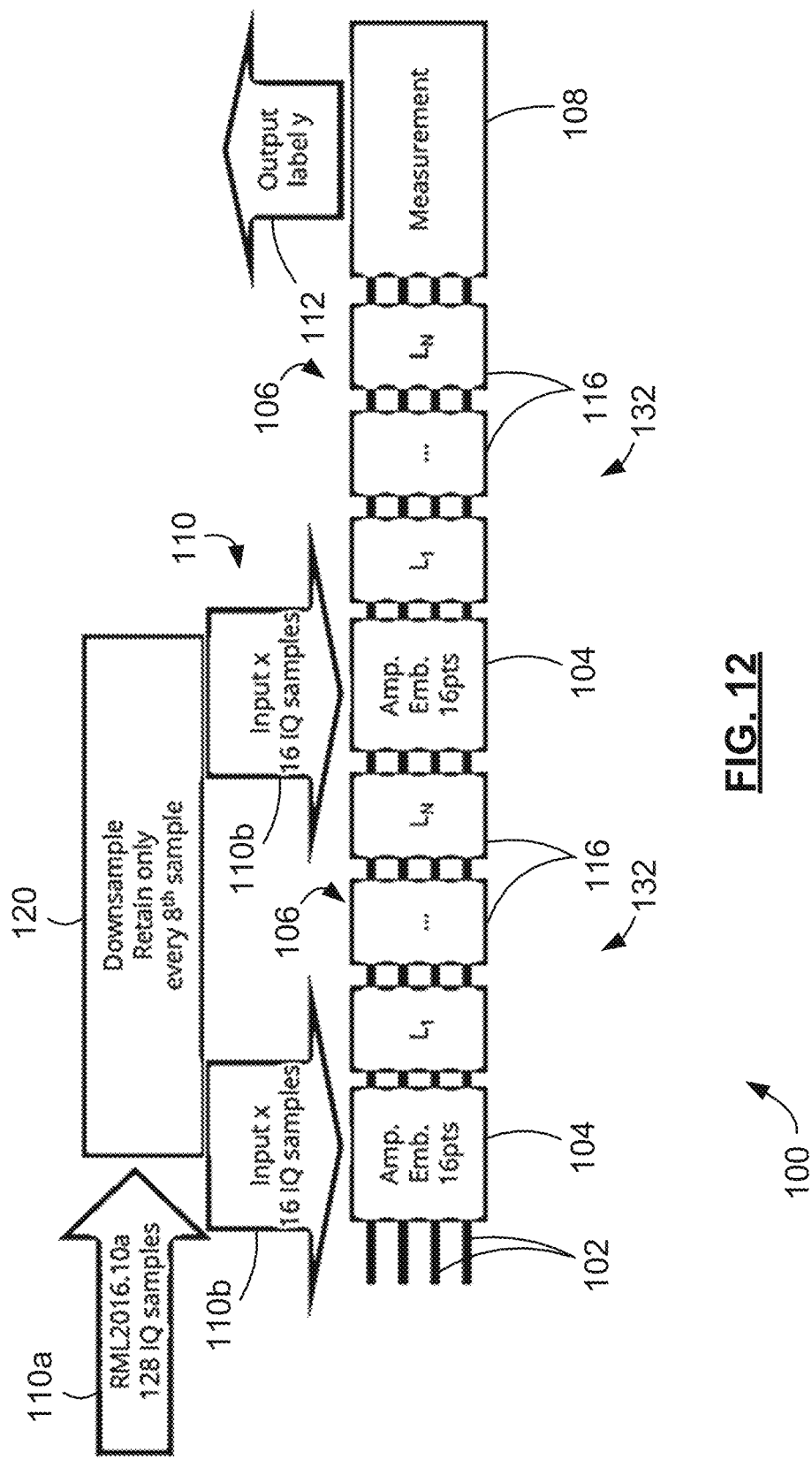
FIG. 12 is a schematic diagram of a fourth experimental quantum modulation classifier.
Figure 15:
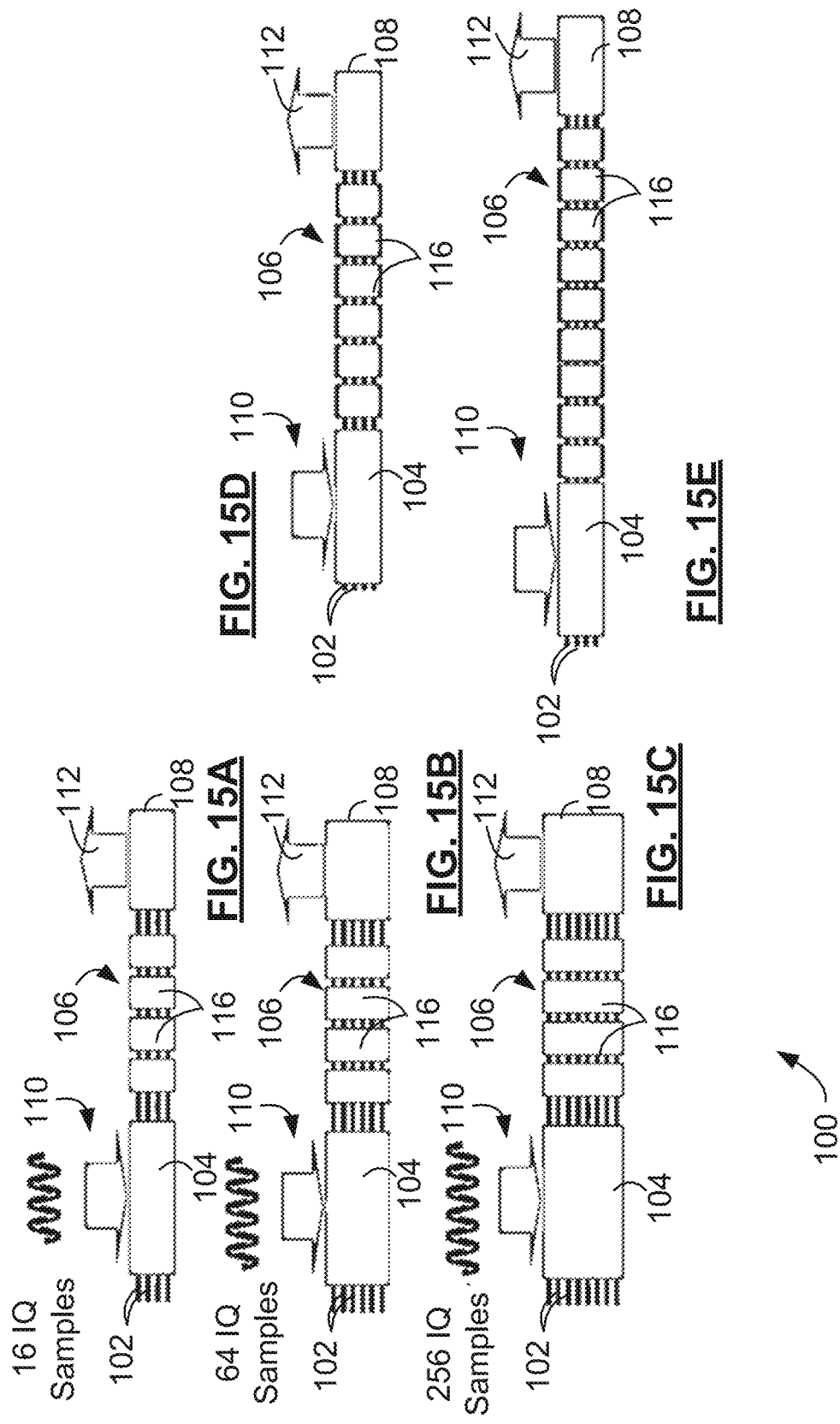
FIG. 15A is a schematic diagram of a fifth experimental quantum modulation classifier.
FIG. 15B is a schematic diagram of a sixth experimental quantum modulation classifier.
FIG. 15C is a schematic diagram of a seventh experimental quantum modulation classifier.
FIG. 15D is a schematic diagram of an eighth experimental quantum modulation classifier.
FIG. 15E is a schematic diagram of a ninth experimental quantum modulation classifier.

The quantum variational classifier 100 exemplified in FIG. 12 was used, incorporating a downsampling module 120 and two embeddings in series. Four qubits were needed. The inventors discovered that the classifier exemplified in FIG. 12 is useful for classification.

Example 2—Dataset

A dataset similar to the radioML2016.10a dataset was used. The dataset was the Qoherent™ AGWN dataset. The Qoherent™ AGWN dataset is similar to the radioML2016.10a dataset, but with the CPFSK class removed and a NBFM class added. The Qoherent™ AGWN dataset does not use the Dynamic Channel Model from GNU Radio™, it uses an AGWN block only. Signal-to-noise ratio (SNR) ranges from −20 decibels to 30 decibels. Examples are 1024 in length and there are 2000 per unique class (SNR and modulation).

Example 2—Variation 1—Results

A quantum variational classifier was used, having five qubits 102, an embedding stage 104, and a variational stage 106 with twelve layers 116. The quantum variational classifier did not implement any re-embeddings. The quantum variational classifier was trained with five epochs on the Qoherent™ AGWN dataset. As exemplified in FIG. 13, the quantum variational classifier achieved high accuracy on the Qoherent™ AGWN dataset, particularly for certain classification pairs.

Example 2—Variation 2—Results

A quantum variational classifier was used, having six qubits 102, an embedding stage 104, a variational stage 106 with six layers 116, and a preprocessing module 120. The preprocessing module 120 used a neural network (efficientnetb0™) as a preprocessing layer that produces a tabular input for ingestion into the later stages of the quantum variational classifier. The neural network was used to perform feature extraction and produce a tabular dataset. Sixty-four time series samples were used. As exemplified in FIG. 14, the quantum variational classifier achieved very high accuracy on the Qoherent™ AGWN dataset for all classes.

Example 3—Dataset

The dataset was generated by a utility built using GNU Radio™ inspired by the RadioML2016 dataset but with a simpler channel model. It included 11 widely used RF modulations; the digital modulations: 8psk, bpsk, gfsk, pam4, gam16, gam64, and qpsk, as well as the analog modulations: am-dsb, am-ssb, nbfm, and wbfm. The AGWN Dataset (v3) consists of these modulations, with only additive Gaussian white noise (AGWN) as a channel model. Signals are swept from SNR of −20 dB to +30 dB in steps of 2 dB. Input samples consist of an array of dimensions 2×1024 (I and Q vs time-series measurements). Input samples may be shortened to the desired length (e.g., 2×32, 2×64) before training, or dynamically during training corresponding to number of qubits used (2n IQ samples for n qubits). 1000 input samples were generated for each modulation and SNR pair, for a total of 286 000 input samples. The dataset was then split, with 60% of the input samples being used for training, with the remaining 40% used for validation.

Example 3—Quantum Variational Classifier

The dataset was used with a quantum variational circuit designed for radio signal classification tasks. The quantum variational circuit was based on quantum variational algorithms (primarily that of Schuld, Maria, et al.) but adapted for modulation recognition. Time-series IQ samples were embedded directly into a quantum state via amplitude embedding by way of Mottonen state preparation.

The quantum variational circuit was implemented using the PennyLane™ Python™ library for quantum computing using a PyTorch™ interface for optimization. Experiments were carried out on a combination of high-performance computing nodes, cloud resources, and workstations. The model was configured as a binary classifier with a host of tests that enabled pairwise comparisons of accuracy across the modulations in the training set. Training was performed using a cross-entropy loss function and optimized using Adam™ (disclosed in D. P. Kingma and J. Ba, "Adam: A method for stochastic optimization," CoRR, vol. abs/1412.6980, 2014. [Online]. Available: http://arxiv.org/abs/1412.6980, hereby incorporated by reference).

The quantum variational circuit's classification capability was tested for a set of modulation pairs and configurations, varying the number of qubits n as well as the number of trainable layers l, to investigate the effect of these factors on both classification accuracy and expressivity (i.e. the model's ability to successfully train on different datasets). Examples of tested quantum variational circuits are shown in FIGS. 15A to 15E.

Example 3—Results

FIGS. 16 and 17 aggregate testing accuracy across all modulation pairs for each configuration. Analyzing the model's expressivity requires comparing the results across specific modulation pairs. Models that are trained on certain modulation pairs consistently tend to converge to a lower final accuracy than others, particularly modulation pairs in the Analog-vs-Analog category. As far as results have shown, the best accuracy occurs on the configurations that have 5 or 6 qubits. Therefore this method has potential on low-qubit NISQ hardware.

Initial training runs were carried out across a number of configurations for 5 epochs, with mean validation accuracies across all modulation pairs reported in FIG. 16. We identified the best performing configuration at n=6 and l=15, with accuracies for each modulation pair for this configuration shown in FIG. 17.

Following this initial run, a select number of configurations were trained further for a total of 20 epochs, with mean accuracies shown in FIG. 18. We see that this further training offers a slight increase to accuracy across all configurations tested with a substantial increase in training and computation time. Learning curves obtained from these training runs showed that marginal improvements are still obtained after 5 epochs, with higher qubit counts benefiting slightly more from longer training.

To see if yet more training would improve the most complex configuration tested, we trained an 8 qubit, 15 layer quantum variational circuit for a total of 50 epochs, with validation accuracies measured after 5, 20, 35 and 50 epochs shown in FIG. 19. From this we saw that while the 8 qubit, 15 layer quantum variational circuit continues to improve after a substantial amount of training, it still does not match the accuracy seen by the 6 qubit, 15 layer quantum variational circuit after 5 epochs.

Figure 20:
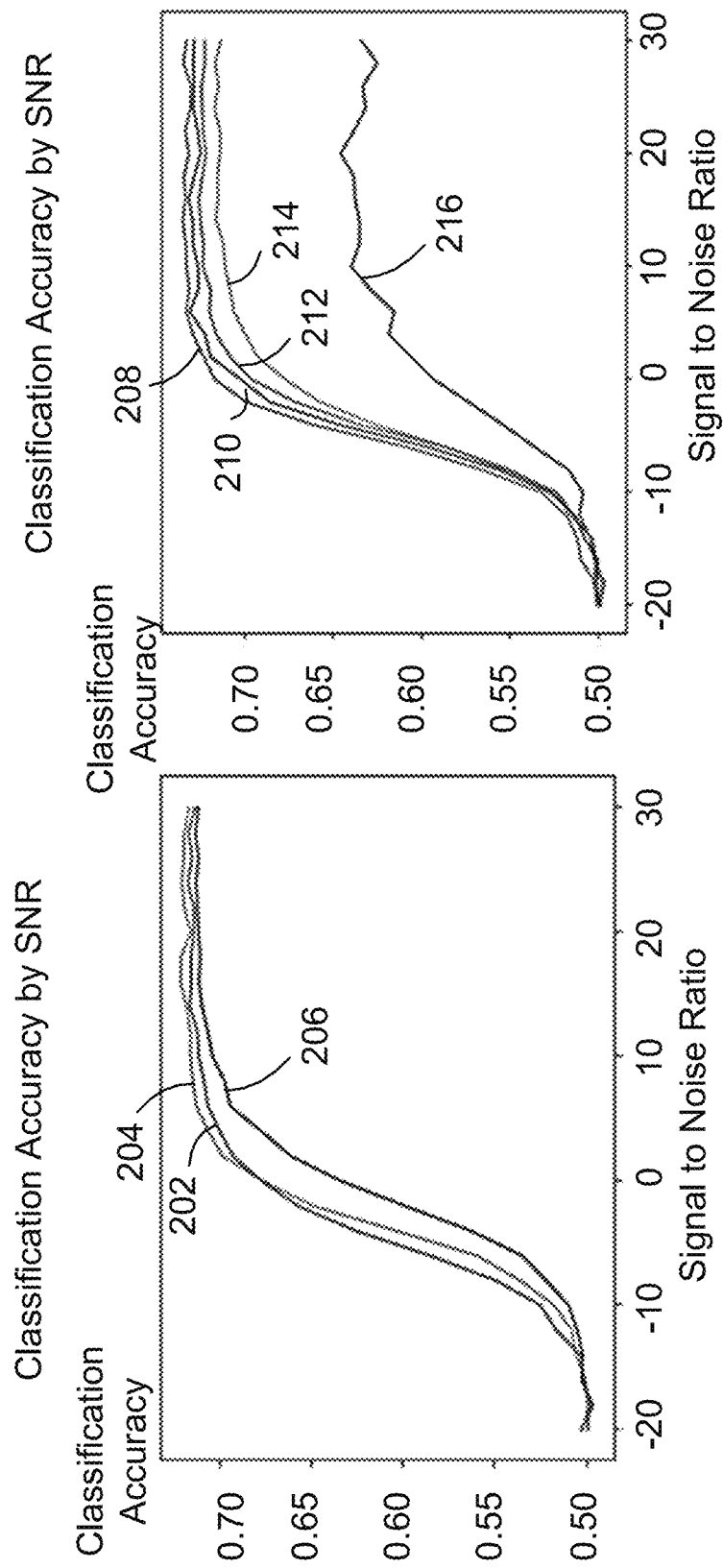
FIG. 20 is a graph of results from further experimental quantum modulation classifiers.

In FIG. 20, illustrated is a first curve 202 for a quantum variational circuit with six layers and six qubits, a second curve 204 for a quantum variational circuit with six layers and five qubits, a third curve 206 for a quantum variational circuit with six layers and four qubits, a fourth curve 208 for a quantum variational circuit with thirteen layers and six qubits, a fifth curve 210 for a quantum variational circuit with ten layers and six qubits, a sixth curve 212 for a quantum variational circuit with eight layers and six qubits, a seventh curve 214 for a quantum variational circuit with six layers and six qubits, and an eighth curve 216 for a quantum variational circuit with one layer and six qubits. We see that accuracy improves at higher SNR levels for tested signals. An observation can be made that increasing qubit count seems to benefit accuracies at low SNR levels the most, while increasing layer count seems to benefit accuracies at high SNR levels.

Figure 21:
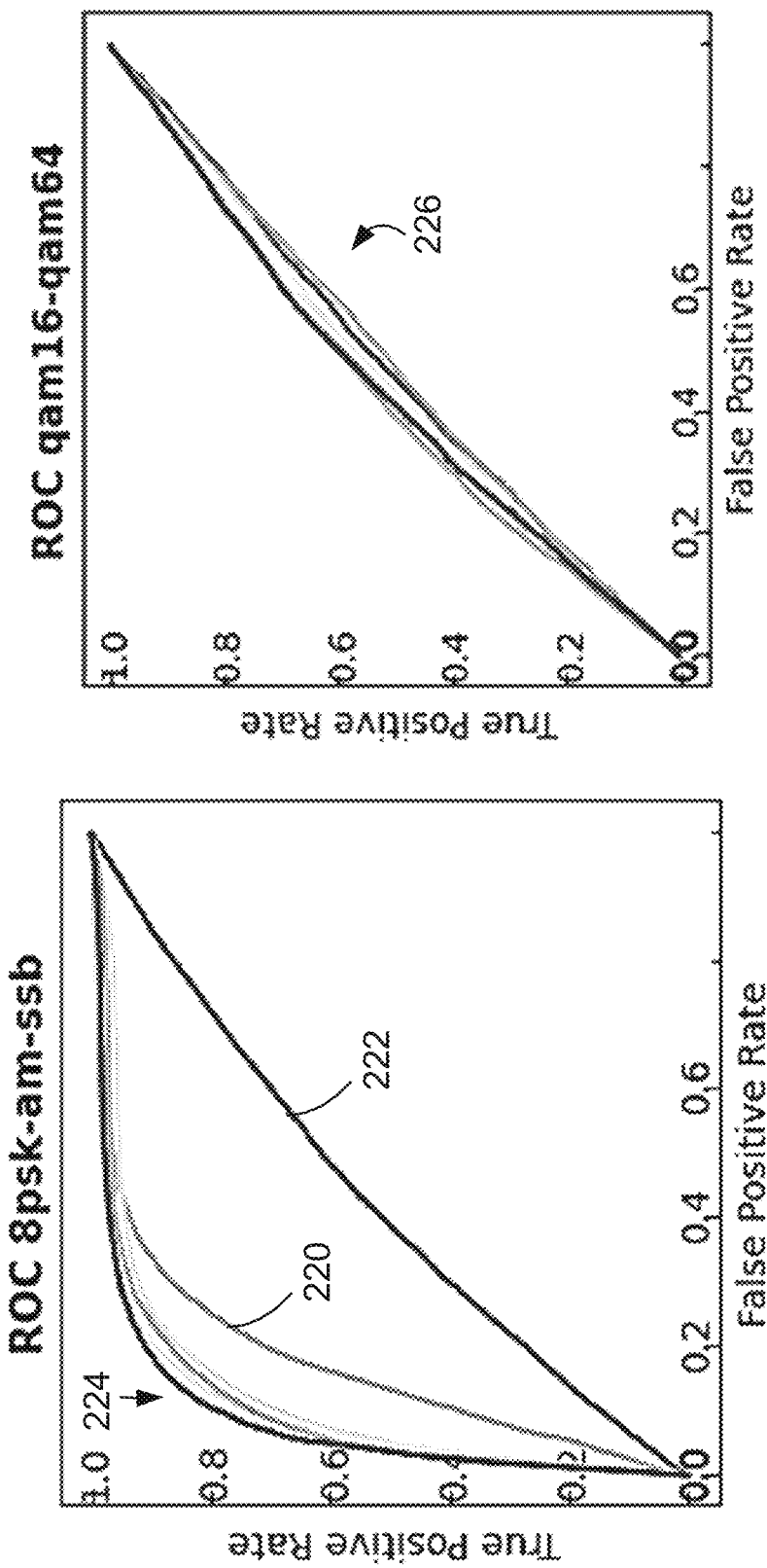
FIG. 21 is a first graph of results from further experimental quantum modulation classifiers.
Figure 22:
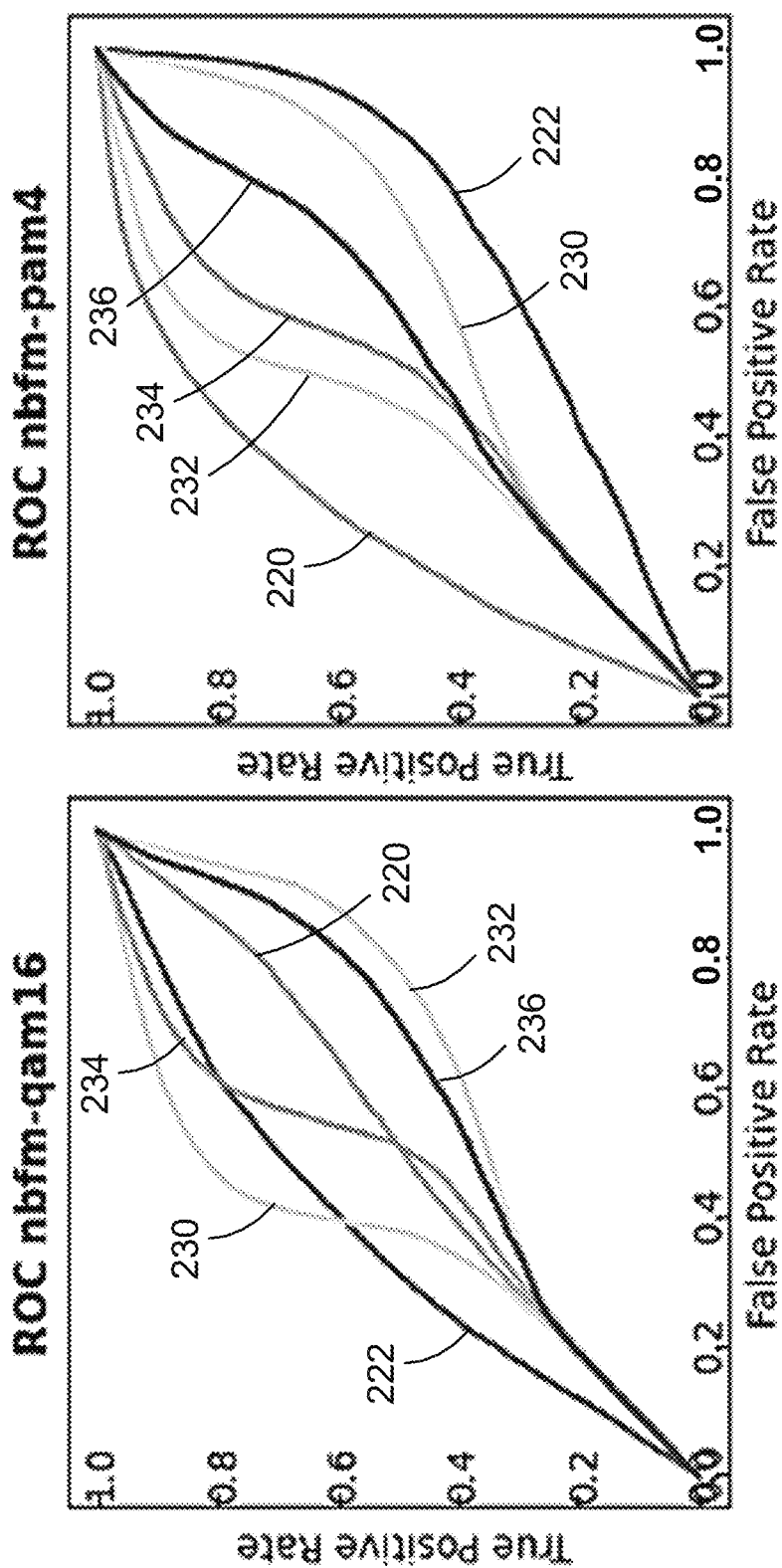
FIG. 22 is a second graph of results from the experimental quantum modulation classifiers of FIG. 21.

Receiver Operating Characteristic (ROC) curves can be used to evaluate the diagnostic ability or sensitivity of a binary classifier by varying the classification threshold between one class versus another. ROC curves are shown for some select examples in FIGS. 21 and 22, showing the results from a few combinations of layers and qubits used in the quantum variational circuit. FIG. 21 shows results from a quantum variational circuit with one layer and five qubits (line 222), a quantum variational circuit with one layer and six qubits (line 220), and, in grouping 224, quantum variational circuits with six layers and five qubits, six layers and six qubits, thirteen layers and five qubits, and thirteen layers and six qubits. Shown in grouping 226 are results from the same set of six quantum variational circuits. FIG. 22 shows results from the same set of six quantum variational circuits, with results from the quantum variational circuit with one layer and five qubits at line 222, results from a quantum variational circuit with one layer and six qubits at line 220, results from a quantum variational circuit with six layer and five qubits at line 230, results from a quantum variational circuit with six layer and six qubits at line 232, results from a quantum variational circuit with thirteen layer and five qubits at line 234, results from a quantum variational circuit with thirteen layer and six qubits at line 236. From these examples we see that a number of different scenarios arise. The case of 8psk vs am-dsb shows a clearly defined ROC curve emerging with higher model complexity, and the quantum variational circuit is able to easily distinguish between these modulations. In the case of gam16 vs gam64, the quantum variational circuit struggles to differentiate between each modulation and only does marginally better than simply randomly guessing a modulation, which would be represented by a diagonal line.

In FIG. 22 we see an odd phenomenon where some configurations of quantum variational circuit are able to distinguish between these particular modulations, while other configurations in fact do worse than a random classifier, more consistently predicting the incorrect modulation, with no clear relationship between model complexity and sensitivity. Deeper investigation into these cases is required to understand whether this is due to overfitting or some other cause.

The quantum variational circuit's classification capability was tested across a wide range of RF modulation pairs and the preliminary results show some patterns that are suggestive of the quantum variational circuit's capability across a wide range of possible classification tasks. The quantum variational circuit remains capable of classifying samples despite decreases in signal-to-noise ratio, demonstrating that the model is robust against noisy and imperfectly sampled data.

The final accuracy obtained at the conclusion of model training tends to increase with the number of trainable layers. The accuracy increases are not strictly monotonic with an increase in the number of layers. The effect of increasing the number of qubits used in the model seems to have a deleterious effect on the final accuracy at the conclusion of training. This may be because models with a larger number of qubits may require longer training and/or a larger training set to obtain a higher accuracy than their counterparts with fewer qubits. This was investigated by increasing the number of training epochs for select configurations, e.g. 8 qubit 15 layer up to 50 epochs. While the accuracy continued to increase, it still did not exceed the accuracy obtained by the 5 and 6 qubit, 15-layer models trained for only 5 epochs.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A quantum modulation classifier, comprising:
a trained quantum variational classifier including a plurality of qubits and comprising:
an embedding stage operable to apply a quantum embedding technique to embed a modulated radio signal,
a variational stage operable to receive the modulated radio signal from the embedding stage and pass the modulated radio signal through a plurality of variational layers, and
a measurement stage operable to receive the modulated radio signal from the variational stage and extract measurement results to classify the modulated radio signal.

2. The quantum modulation classifier of claim 1, wherein the quantum variational classifier further comprises a preprocessing module operable to receive the modulated radio signal and apply a preprocessing step to transform the modulated radio signal into a representation that is more suitable for the quantum embedding technique prior to passing the modulated radio signal to the embedding stage.

3. The quantum modulation classifier of claim 1, wherein the quantum variational classifier is configured for re-embedding of the modulated radio signal in parallel.

4. The quantum modulation classifier of claim 1, wherein the quantum variational classifier is configured for re-embedding of the modulated radio signal in series.

5. The quantum modulation classifier of claim 1, wherein the radio signal is a frequency modulated signal.

6. The quantum modulation classifier of claim 1, wherein the quantum embedding technique is amplitude embedding.

7. The quantum modulation classifier of claim 1, wherein the quantum embedding technique is angle embedding.

8. The quantum modulation classifier of claim 1, wherein the variational stage includes at least twenty variational layers.

9. A quantum modulation classifier, comprising:
a radio signal receiver operable to measure a modulated radio signal; and
a trained quantum variational classifier communicatively coupled to the radio signal receiver to receive the modulated radio signal, the quantum variational classifier including a plurality of qubits and comprising:
an embedding stage operable to apply a quantum embedding technique to embed the modulated radio signal,
a variational stage operable to receive the modulated radio signal from the embedding stage and pass the modulated radio signal through a plurality of variational layers, and
a measurement stage operable to receive the modulated radio signal from the variational stage and extract measurement results to classify the modulated radio signal.

10. The quantum modulation classifier of claim 9, wherein the quantum variational classifier further comprises a preprocessing module operable to receive the modulated radio signal and apply a preprocessing step to transform the modulated radio signal into a representation that is more suitable for the quantum embedding technique prior to passing the modulated radio signal to the embedding stage.

11. The quantum modulation classifier of claim 9, wherein the quantum variational classifier is configured for re-embedding of the modulated radio signal in parallel.

12. The quantum modulation classifier of claim 9, wherein the quantum variational classifier is configured for re-embedding of the modulated radio signal in series.

13. The quantum modulation classifier of claim 9, wherein the modulated radio signal is a frequency modulated signal.

14. A quantum modulation classification method, comprising:
receiving a modulated radio signal
embedding the modulated radio signal using an embedding stage of a quantum variational classifier;
passing the embedded modulated radio signal through a variational stage of the quantum variational classifier;

extracting measurement results from the embedded modulated radio signal passed through the variational stage using a measurement stage of the quantum variational classifier; and classifying the modulated radio signal using the measurement results.

15. The quantum modulation classification method of claim 14, further comprising applying a preprocessing step to transform the modulated radio signal into a representation that is more suitable for a quantum embedding technique prior to embedding the modulated radio signal.

16. The quantum modulation classification method of claim 14, further comprising re-embedding the modulated radio signal in parallel.

17. The quantum modulation classification method of claim 14, further comprising re-embedding the modulated radio signal in series.

18. The quantum modulation classification method of claim 14, wherein embedding the modulated radio signal includes performing amplitude embedding of the modulated radio signal.

19. The quantum modulation classification method of claim 14, wherein embedding the modulated radio signal includes performing angle embedding of the modulated radio signal.

* * * * *